United States Patent
da Silva et al.

(10) Patent No.: US 12,156,243 B2
(45) Date of Patent: *Nov. 26, 2024

(54) RLM AND BEAM FAILURE DETECTION BASED ON A MIX OF DIFFERENT REFERENCE SIGNALS

(71) Applicant: Telefonaktiebolaget LM Ericsson (publ), Stockholm (SE)

(72) Inventors: Icaro L. J. da Silva, Solna (SE); Rui Fan, Beijing (CN); Claes Tidestav, Bålsta (SE); Umut Ugurlu, Cambridge (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,993

(22) Filed: Nov. 22, 2022

(65) Prior Publication Data

US 2023/0105488 A1 Apr. 6, 2023

Related U.S. Application Data

(63) Continuation of application No. 16/944,846, filed on Jul. 31, 2020, now Pat. No. 11,540,296, which is a (Continued)

(30) Foreign Application Priority Data

Mar. 24, 2017 (WO) ................ PCT/CN2017/078131

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0023* (2013.01); *H04W 56/001* (2013.01); *H04W 72/30* (2023.01)

(58) Field of Classification Search
CPC . H04W 72/542; H04W 56/001; H04W 76/18; H04W 72/30; H04W 76/19; H04L 5/0023; Y02D 30/70
See application file for complete search history.

(56) References Cited

U.S. PATENT DOCUMENTS 9,173,109 B2    10/2015   Xu et al.
9,198,070 B2    11/2015   Krishnamurthy et al.
(Continued)

FOREIGN PATENT DOCUMENTS

RU    2597877 C2    9/2016
RU    2612408 C1    3/2017
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 1-406.
(Continued)

*Primary Examiner* — Brian D Nguyen
(74) *Attorney, Agent, or Firm* — Murphy, Bilak & Homiller, PLLC

(57) ABSTRACT

A user equipment, UE, performs measurements based on a plurality of RLM sources received in beam-formed downlink signals, where the measurements indicate a quality of a given cell or beam. The plurality of sources comprises two or more of: first reference signals (RSs), second RSs of a different type than the first RSs, and one or more physical channel quality indicators obtained from non-reference-
(Continued)

signal data in the beam-formed downlink signals. For each of the plurality of sources used to perform measurements, the UE determines whether a measurement for the respective source indicates an out-of-sync event in response to the measurement being below a first threshold. The UE then performs an RLM action based on determined occurrences of out-of-sync events.

20 Claims, 24 Drawing Sheets

Related U.S. Application Data continuation of application No. 16/082,571, filed as application No. PCT/SE2018/050308 on Mar. 23, 2018, now Pat. No. 10,743,326.

(51) Int. Cl.
*H04W 56/00* (2009.01)
*H04W 72/30* (2023.01)

(56) References Cited

U.S. PATENT DOCUMENTS

| | | | |
|---|---|---|---|
| 10,931,515 | B2 | 2/2021 | Han et al. |
| 11,258,573 | B2 | 2/2022 | Kim et al. |
| 2014/0269368 | A1 | 9/2014 | Xu et al. |
| 2015/0043515 | A1 | 2/2015 | Zhang et al. |
| 2016/0255590 | A1 | 9/2016 | Wang et al. |
| 2016/0278103 | A1 | 9/2016 | Kazmi et al. |
| 2017/0230926 | A1 | 8/2017 | Seo et al. |
| 2018/0007574 | A1 | 1/2018 | Park et al. |
| 2018/0324702 | A1 | 11/2018 | Takahashi et al. |
| 2019/0053118 | A1 | 2/2019 | Hahn et al. |
| 2019/0059031 | A1 | 2/2019 | Hahn et al. |
| 2019/0132808 | A1 | 5/2019 | Tsuboi et al. |
| 2019/0182691 | A1 | 6/2019 | Wang et al. |
| 2019/0320361 | A1 | 10/2019 | Uchiyama et al. |
| 2019/0357065 | A1 | 11/2019 | Cho et al. |
| 2019/0380075 | A1 | 12/2019 | Ugurlu et al. |
| 2020/0236566 | A1* | 7/2020 | Kou ............... H04W 76/18 |
| 2020/0274679 | A1* | 8/2020 | Futaki ............. H04W 24/08 |
| 2020/0296656 | A1* | 9/2020 | Amuru ............. H04L 1/1816 |
| 2020/0314946 | A1* | 10/2020 | Tsuboi ............. H04W 24/10 |
| 2021/0058797 | A1* | 2/2021 | Yoshioka ......... H04W 24/04 |
| 2021/0344431 | A1* | 11/2021 | Zhang ............. H04B 7/0695 |

FOREIGN PATENT DOCUMENTS

| | | |
|---|---|---|
| WO | 2010051504 A1 | 5/2010 |
| WO | 2012116022 A1 | 8/2012 |
| WO | 2013170209 A1 | 11/2013 |
| WO | 2015021320 A1 | 2/2015 |
| WO | 2016122232 A1 | 8/2016 |
| WO | 2016127403 A1 | 8/2016 |
| WO | 2018084798 A1 | 5/2018 |
| WO | 2018084799 A1 | 5/2018 |
| WO | 2018084800 A1 | 5/2018 |

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 14) The present", 3GPP TS 36.214 V14.0.0, Sep. 2016, 1-20.
3GPP, "3rd Generation Partnership Project; Technical Specification Group Radio Access Network; Evolved Universal Terrestrial Radio Access (E-UTRA); User Equipment (UE) conformance specification Radio transmission and reception Part 1: Conformance Testing; (Releas", 3GPP TS 36.521-1 V14.0.0, Sep. 2016, 1-3733.
3GPP, "3rd Generation Partnership Project; Technical Specification Group Radio Access Network; Evolved Universal Terrestrial Radio Access (E-UTRA); Requirements for support of radio resource management (Release 14)", 3GPP TS 36.133 V14.2.0 (Dec. 2016), Dec. 2016, pp. 1-2304.
Unknown, Author, "Beam recovery", 3GPP TSG RAN WG2#97, R2-1701730, Athens, Greece, Feb. 13-17, 2017, 1-2.
Unknown, Author, "Discussion on NR-PDCCH structure", 3GPP TSG RAN WG1 Meeting #88, R1-1702475, Athens, Greece, Feb. 13-17, 2017, 1-4.
Unknown, Author, "Final Report of 3GPP TSG RAN WG1 #87 v1.0.0", 3GPP TSG RAN WG1 Meeting #88, R1-1701552, Athens, Greece, Feb. 13-17, 2017, 1-157.
Unknown, Author, "Final Report of 3GPP TSG RAN WG1 #88 v1.0.0", 3GPP TSG RAN WG1 Meeting #88bis, R1-1704172, Spokane, USA, Apr. 3-7, 2017, 1-152.
Unknown, Author, "New SID Proposal: Study on New Radio Access Technology", 3GPP TSG RAN Meeting #71, RP-160671, Goteborg, NTT DOCOMO, Mar. 7-10, 2016, 1-8.
Unknown, Author, "NR Radio Link Monitoring", 3GPP TSG RAN WG1 Meeting AH 1801, R1-1800235, Vancouver, Canada, Jan. 22-26, 2018, 1-5.
Unknown, Author, "Radio link monitoring and radio link failure handling", 3GPP TSG RAN WG2#97, R2-1701729, Athens, Greece, Feb. 13-17, 2017, 1-3.
Unknown, Author, "Remaining details on radio link monitoring", 3GPP TSG-RAN WG1 NR AH #18-01, R1-1800808, Vancouver, Canada, Jan. 22-26, 2018, 1-4.
Unknown, Author, "Remaining details on radio link monitoring", 3GPP TSG RAN WG1 Meeting AH 1801, R1-1800900, Vancouver, Canada, Jan. 22-26, 2018, 1-5.
Unknown, Author, "Report of 3GPP TSG RAN WG2 meeting #95bis", 3GPP TSG-RAN Working Group 2 meeting #96, R2-167461, Reno, Nevada, Nov. 14-18, 2016, 1-196.
Unknown, Author, "Report of 3GPP TSG RAN WG2 meeting #97, Athens, Greece", 3GPP TSG-RAN Working Group 2 meeting #97bis, R2-1702451, Spokane, USA, Apr. 3-7, 2017, 1-300.
Unknown, Author, "RLM and RLF in HF NR", 3GPP TSG RAN WG2 Meeting #95, R2-164899, Gothenburg, Sweden, Aug. 22-26, 2016, 1-4.
Unknown, Author, "RLM and RLF in NR", 3GPP TSG-RAN WG2 #97, Tdoc R2-1700868, Athens, Greece, Feb. 13-17, 2017, 1-4.

* cited by examiner

RLM AND BEAM FAILURE DETECTION BASED ON A MIX OF DIFFERENT REFERENCE SIGNALS

TECHNICAL BACKGROUND

The present disclosure is generally related to wireless communications systems and is more particularly related to radio link monitoring (RLM) and beam-failure detection by a wireless device in such systems.

BACKGROUND

Radio Link Monitoring (RLM) in LTE

The Long-Term Evolution (LTE) wireless system developed by the $3^{rd}$-Generation Partnership Project (3GPP) is a widely deployed fourth-generation wireless communications system. In LTE and its predecessor systems, the purpose of the RLM function in a wireless device, referred to in 3GPP documentation as a "user equipment," or "UE," is to monitor the downlink radio link quality of the serving cell in RRC_CONNECTED state. This monitoring is based on Cell-Specific Reference Signals (CRS), which are always associated to a given LTE cell and are derived from the Physical Cell Identifier (PCI). RLM in turn enables the UE, when in RRC_CONNECTED state, to determine whether it is in-sync or out-of-sync with respect to its serving cell, as described in 3GPP TS 36.213, v14.0.0.

The UE's estimate of the downlink radio link quality, based on its measurements of the CRS, is compared with out-of-sync and in-sync thresholds, Qout and Qin respectively, for the purposes of RLM. These thresholds are standardized in terms of the Block Error Rate (BLER) of a hypothetical Physical Downlink Control Channel (PDCCH) transmission from the serving cell. Specifically, Qout corresponds to a 10% BLER, while Qin corresponds to a 2% BLER. The same threshold levels are applicable whether DRX is in use, or not.

The mapping between the CRS-based downlink quality and the hypothetical PDCCH BLER is up to the UE implementation. However, the performance is verified by conformance tests defined for various environments, as described in 3GPP TS 36.521-1, v14.0.0. Also, the downlink quality is calculated based on the CRS over the whole band, since the UE does not necessarily know where PDCCH is going to be scheduled. As illustrated in FIG. 1, PDCCH transmissions can be scheduled anywhere over the whole downlink transmission bandwidth.

When no Discontinuous Reception (DRX) is configured, out-of-sync occurs when the downlink radio link quality estimated over a 200-millisecond period becomes worse than the threshold Qout. Similarly, without DRX, in-sync occurs when the downlink radio link quality estimated over a 100-millisecond period becomes better than the threshold Qin. Upon detection of out-of-sync, the UE initiates the evaluation of in-sync. The occurrences of out-of-sync and in-sync are reported internally by the UE's physical layer to its higher layers, which in turn may apply layer 3 (i.e., higher layer) filtering for the evaluation of Radio Link Failure (RLF). The higher-layer RLM procedure is illustrated in FIG. 2.

When DRX is in use, the out-of-sync and in-sync evaluation periods are extended, to enable sufficient UE power saving, and depend upon the configured DRX cycle length. The UE starts in-sync evaluation whenever out-of-sync occurs. Therefore, the same period (TEvaluate_Qout_DRX) is used for the evaluation of out-of-sync and in-sync. However, upon starting the RLF timer (T310) until its expiry, the in-sync evaluation period is shortened to 100 milliseconds, which is the same as without DRX. If the timer T310 is stopped due to N310 consecutive in-sync indications, the UE performs in-sync evaluation according to the DRX based period (TEvaluate_Qout_DRX).

The whole methodology used for RLM in LTE (i.e., measuring the CRS to "estimate" the PDCCH quality) relies on the fact that the UE is connected to an LTE cell, which is the single connectivity entity transmitting both PDCCH and CRSs.

5G Development

A study item for the new 5G radio access technology, entitled New Radio (NR) has been started in 3GPP [3GPP RP-1606713]. Companies have agreed on assumptions on the following design principles: ultra-lean design for the new 5G radio access technology, which is referred to as "NR"; and massive usage of beamforming. So far, the details of RLM have not been established. However, companies have expressed the view that beamforming needs to be taken into account when RLM is designed, which is not the case in LTE. In addition to that, concerns have been expressed regarding how the UE should measure the quality of a cell.

Problems with Existing Solutions

Following are some of the principles of the 5G NR that may drive the need for new solutions for RLM and beam-failure detection, compared to the existing solution in LTE.

Ultra-Lean Design in the New 5G Radio (NR)

NR is expected to be an ultra-lean system, which implies the minimization of always-on transmissions, aiming for an energy efficient future-proof system. Early assumptions in 3GPP show that this principle has been endorsed and there is a common understanding that NR should be a lean system. In RAN1 #84bis, RAN1 made the following agreements regarding ultra-lean design:

The NR design shall strive for maximizing the amount of time and frequency resources that can be flexibly utilized or that can be left blanked without causing backward compatibility issues in the future. Blank resources can be used for future use. The NR design shall also strive for minimizing transmission of always-on signals and confining signals and channels for physical layer functionalities (signals, channels, signaling) within a configurable/allocable time/frequency resource.

As described above, however, RLM in LTE is based on CRSs, a wide band signal transmitted in all subframes. A major consequence of the lean-design principle with respect to the RLM design in NR is that there is a wish to avoid the design of a wide band signals transmitted in all subframes. Therefore, lean design will prohibit the usage of the LTE solution for RLM in NR.

Beamforming in the New 5G Radio (NR)

There is a common understanding that NR will consider frequency ranges up to 100 GHz. In comparison to the frequency bands currently allocated to LTE, some of the new bands will have much more challenging propagation properties such as lower diffraction and higher outdoor/indoor penetration losses. Consequently, signals will have less ability to propagate around corners and penetrate walls. In addition, in high frequency bands, atmospheric/rain attenuation and higher body losses render the coverage of NR signals even spottier. Fortunately, operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will rely on massive beamforming to provide coverage, which means that NR is often referred to as a beam-based system.

It is also known that different antenna architectures should be supported in NR: analog, hybrid and digital. This implies some limitations in terms of how many directions can be covered simultaneously, especially in the case of analog/hybrid beamforming. To find a good beam direction at a given Transmission Reception Point (TRP)/access node/antenna array, a beam-sweep procedure is typically employed. A typical example of a beam-sweep procedure is that the node points a beam containing a synchronization signal and/or a beam identification signal, in each of several possible directions, one or few directions at a time. This is illustrated in FIG. 3, where each of the illustrated lobes represents a beam, and where the beams may be transmitted consecutively, in a sweeping fashion, or at the same time, or in some combination. If the same coverage properties apply to both a synchronization signal and beam identification signal in each beam, the UE can not only synchronize to a TRP but also gain the best beam knowledge at a given location.

Beam Failure Detection and Recovery

Due to high beamforming gains in NR, the need for some beam failure detection and recovery mechanisms emerges as an important issue. Narrow beamforming is considered a key component in NR, as it will enable high signal-to-interference-plus-noise ratio (SINR) levels at the cell edge, thanks to both higher antenna gains as well as lower inter-cell interference, due to pinpointing the signal energy at the desired UE location via a narrow beam. However, forming these narrow beams come at the cost of beam pattern misalignments in high mobility scenarios. If a UE changes its location suddenly, there will be sudden alterations in the line-of-sight angle, or, if the beam pattern is physically obstructed by a blockage effect in the propagation environment, the quality of the received signal may drop sharply. In either case, the network will be required to monitor and detect any spontaneous beam failures and perform a beam recovery procedure when necessary. The possibility of a UE experiencing sudden decreases in beam quality is a more significant issue in NR, compared with legacy systems such as LTE.

Before triggering an RLF procedure or starting to search for a new cell when the UE assumes that its serving cell is no longer reachable, it is necessary for a UE to first detect whether the link problem can be recovered by switching from one beam to another beam that is still in the same serving cell. This is because many beams can share the same baseband or antenna board. It is not necessary to reestablish a resource radio control (RRC) connection simply because the UE cannot communicate with a single beam, when other beams in the same cell are available. A light and fast beam recovery procedure should be initiated when there is a beam failure, which can improve UE performance significantly as compared to using an RLF procedure.

Mobility Reference Signal in NR: 3GPP Assumptions

In 3GPP discussions so far, there has been some agreement regarding mobility reference signals (MRSs) that are used by the UE for measurements related to mobility (e.g., handover, or HO). Agreements for downlink-based mobility in RRC_CONNECTED mode mobility (optimized for data transmission, at least for network-controlled mobility) with RRC involvement, concerning beams and the relation to the NR cell definition, may include the following. 1) The UE at least measures one or more individual beams and the gNB (an NR base station) should have mechanisms to consider those beams to perform HO. Note that this is necessary at least to trigger inter-gNB handovers and to reduce HO ping-pongs and HO failures. UEs may report individual and/or combined qualities of multiple beams. 2) The UE should be able to distinguish between the beams from its serving cell and beams from non-serving cells for radio resource management (RRM) measurements. The UE should be able to determine if a beam is from its serving cell. It is yet to be determined whether a serving/non-serving cell may be termed 'serving/non-serving set of beams,' whether the UE is informed via dedicated signalling or implicitly detected by the UE based on some broadcast signals, and how the cell in connected mode relates to the cell in idle mode. 3) A cell quality may be derived based on measurements from individual beams.

Other agreements include that 4) an RRC_CONNECTED UE should be able to perform RRM measurements using always-on reference signals (e.g., synchronization signal) and that 5) RRC_CONNECTED UEs should be able to perform RRM measurements (measurements for mobility purposes) on an additional reference signal (e.g., channel state information (CSI)-RS, MRS, etc.). 6) The network should be able to configure RRM measurements via dedicated signalling to be performed on additional RS and/or IDLE RS.

Agreements also include that there will be 7) support for variable/configurable demodulation reference signal (DMRS) patterns for data demodulation, where at least one configuration supports a front-loaded DMRS pattern. Agreements also include that 8) at least an NR secondary synchronization signal (NR-SSS) is used for a downlink-based RRM measurement for L3 mobility in IDLE mode. It is yet to be determined whether there are potentially additional uses of DM-RS for PBCH (if defined) for measurement in IDLE mode and whether the NR-SSS alone will satisfy the requirements for RRM measurement.

Agreements includes that 9) for CONNECTED mode RRM measurement for layer 3 (L3) mobility, CSI-RS can be used, in addition to an IDLE mode reference signal. Detection of neighbor cells for measurement is based on NR-SS. Agreements also include that 10) beam failure is defined as PDCCH falling below a certain quality. The network configures resources for the UE to transmit a beam link recovery request at least in a RACH region.

SUMMARY

Described in detail below are techniques by which the wireless device (e.g., UE) can measure its serving cell quality, where a cell is transmitting signals in a beamforming manner in a lean design, i.e., without always-on reference signals transmitted in the whole band and across all subframes.

Embodiments of the present invention involve a UE and a network radio access node where the UE performs RLM based on multiple "sources" that can be used to indicate to the UE the quality of a given cell or beam (or the link within a cell). These RLM measurement sources may be two or more different reference signals or a mix of reference signals and physical channel quality indicators obtained from non-reference-signal data (e.g., PDCCH successful decoding, CSI indications, etc.). For purposes of this description, beam-failure detection will be considered a form of RLM. Therefore, while the embodiments described herein refer to performing RLM, RLM measurement sources and performing an RLM action, these measurement sources and actions are appropriate for and are meant to include both beam-failure detection and RLM more generally.

These embodiments may involve RLM that is also based on the estimated quality of the main downlink control channel, such as PDCCH, which is monitored by the UE for scheduling assignments in a connected state. In legacy mobile systems (e.g., LTE), the PDCCH quality is estimated based only on the received signal strength of a single reference signal type (e.g., CRS), while these embodiments rely on multiple sources. Also, in legacy systems, CRS are always transmitted (so that a single source is always available), while in 5G, transmissions will be sparse and not always available, so the usage of multiple sources becomes an advantageous solution.

One main advantage of the embodiments is that the UE can opportunistically use, for RLM and beam failure detection purposes, the PDCCH, DMRSs or PDCCH indications. In addition, the UE can use additional reference signals (possibly periodic) when data is not being scheduled. When a UE is scheduled, RLM based on DMRS is very accurate. When UE is not scheduled, no extra overhead is needed for RLM purposes and the UE can still estimate a hypothetical PDCCH quality where such hypothetical PDCCH is assumed to be configured on similar resources as the additional reference signals.

Benefits of the embodiments include that UEs in a beam-based network can leverage all available RS types and monitor the ones that will provide the most accurate RLM measurements. So, RLM accuracy is improved. Since UE has the flexibility to use different RS types, the network does not need to resort to configuring too many radio resources to improve RLM accuracy. If a standalone lean RS is used for RLM, the network may be required to configure more frequency resources as proposed in the first and third solutions described earlier. Therefore, using different RS types for RLM helps achieve leaner signaling in the network.

According to some embodiments, a method in a user equipment (UE) includes performing measurements based on a plurality of RLM measurement sources received in beam-formed downlink signals, where the measurements indicate a quality of a given cell or beam. The plurality of sources includes two or more of: one or more first RSs, one or more second RSs of a different type than the first one or more RSs, and one or more physical channel quality indicators obtained from non-reference-signal data in the beam-formed downlink signals. For each of the plurality of sources used to perform measurements, the method includes determining that a measurement for the respective source indicates an out-of-sync event in response to the measurement being below a first threshold. The method further includes performing an RLM or beam-failure-detection action based on determined occurrences of out-of-sync events.

According to some embodiments, a method in a user equipment (UE) includes performing, during a first time interval of an evaluation period, measurements using a RLM or beam-failure-detection source received in beam-formed downlink signals, where the measurements indicate a quality of a given cell or beam. The source includes one of: one or more first RSs, one or more second RSs of a different type than the first one or more RSs, and one or more physical channel quality indicators obtained from non-reference-signal data in the beam-formed downlink signals. The method includes determining a number of occurrences of the source during the first time interval from the beginning of the evaluation period. The method includes, in response to determining that the number of occurrences has met an occurrence threshold, continuing to perform the measurements using the source as a primary source for the remainder of the evaluation period. The method also includes, in response to determining that the number of occurrences has not met the occurrence threshold, selecting, as a secondary source, a different one of the one or more first RSs, one or more second RSs and one or more physical channel quality indicators obtained from non-reference-signal data in the beam-formed downlink signals, and instead performing measurements using the secondary source for the remainder of the evaluation period. The method further includes performing an RLM or beam-failure-detection action based on the measurements performed using at least one of the primary and secondary sources.

According to some embodiments, a method in an access node of a wireless communications system includes transmitting, in beam-formed downlink signals, a plurality of RLM or beam-failure-detection sources, where the plurality of sources comprises one or more first RSs and one or more second RSs of a different type than the first one or more RSs. The method also includes configuring a UE to perform measurements based on a plurality of sources received in the beam-formed downlink signals, wherein the measurements indicate a quality of a given cell or beam, where the UE is enabled to perform an RLM or beam-failure-detection action based on occurrences of in-sync and out-of-sync events determined from the measurements.

According to some embodiments, a UE includes transceiver circuitry configured for receiving beam-formed downlink signals and processing circuitry operatively associated with the transceiver circuitry. The processing circuitry is configured to perform measurements based on a plurality of RLM measurement sources received in the beam-formed downlink signals, where the measurements indicate a quality of a given cell or beam. The plurality of RLM measurement sources comprises two or more of: one or more first RSs, one or more second RSs of a different type than the first one or more RSs, and one or more physical channel quality indicators obtained from non-reference-signal data in the beam-formed downlink signals. The processing circuitry is configured to, for each of a plurality of evaluation periods and for each of the plurality of RLM measurement sources used to perform measurements: determine whether a measurement for the respective RLM measurement source indicates an out-of-sync event in response to the measurement being below a first threshold. The processing circuitry is also configured to perform one or more RLM actions based on determined occurrences of out-of-sync events.

According to some embodiments, a UE includes transceiver circuitry configured for receiving beam-formed downlink signals and processing circuitry operatively associated with the transceiver circuitry. The processing circuitry is configured to perform, during a first time interval of an evaluation period, measurements using an RLM source received in beam-formed downlink signals, where the measurements indicate a quality of a given cell or beam. The RLM measurement source comprises one of: one or more first RSs, one or more second RSs of a different type than the first one or more RSs, and one or more physical channel quality indicators obtained from non-reference-signal data in the beam-formed downlink signals. The processing circuitry is configured to determine a number of occurrences of the RLM measurement source during the first time interval from the beginning of the evaluation period. The processing circuitry is configured to, in response to determining that the number of occurrences has met an occurrence threshold, continue to perform the measurements using the RLM measurement source as a primary source for the remainder of the evaluation period and, in response to determining that the number of occurrences has not met the occurrence threshold, select, as a secondary source, a different one of the one or more first RSs, one or more second RSs and one or more physical channel quality indicators obtained from non-reference-signal data in the beam-formed downlink signals, and instead perform measurements using the secondary source for the remainder of the evaluation period. The processing circuitry is also configured to perform one or more RLM actions based on the measurements performed using at least one of the primary and secondary sources.

According to some embodiments, an access node of a wireless communications system includes transceiver circuitry configured for transmitting beam-formed downlink signals and communicating with a UE and processing circuitry operatively associated with the transceiver circuitry. The processing circuitry is configured to transmit, in beam-formed downlink signals via the transceiver circuitry, a plurality of RLM measurement sources, where the plurality of RLM measurement sources comprises one or more first RSs and one or more second RSs of a different type than the first one or more RSs. The processing circuitry is also configured to configure the UE to perform measurements based on a plurality of RLM measurement sources received in the beam-formed downlink signals, where the measurements indicate a quality of a given cell or beam, thereby enabling the UE to perform one or more RLM actions based on occurrences of in-sync and out-of-sync events determined from the measurements.

Further aspects of the present invention are directed to an apparatus, computer program products or computer readable storage medium corresponding to the methods summarized above and functional implementations of the above-summarized apparatus and UE.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
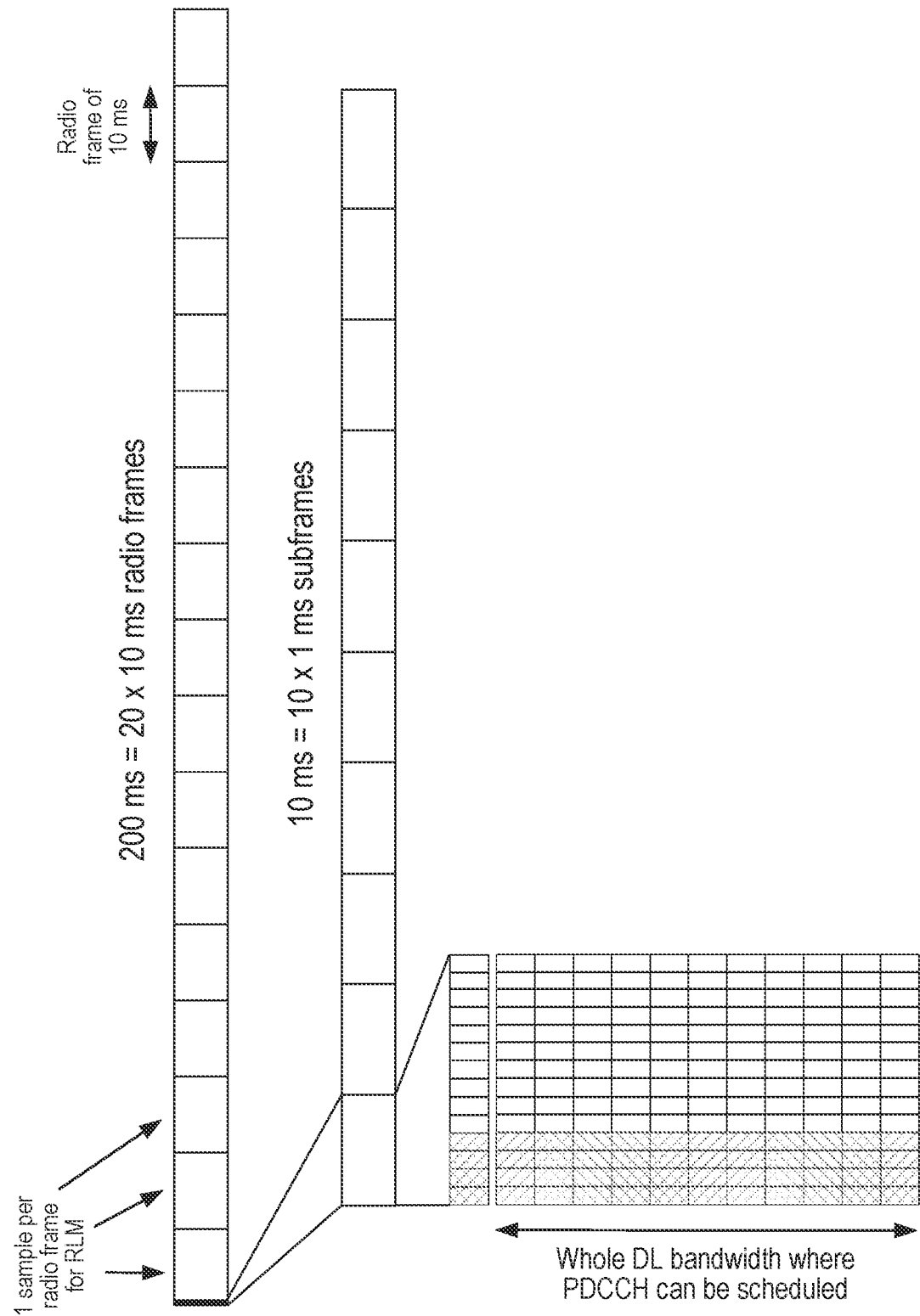
FIG. 1 illustrates how PDCCH can be scheduled anywhere over the whole downlink transmission bandwidth.
Figure 2:
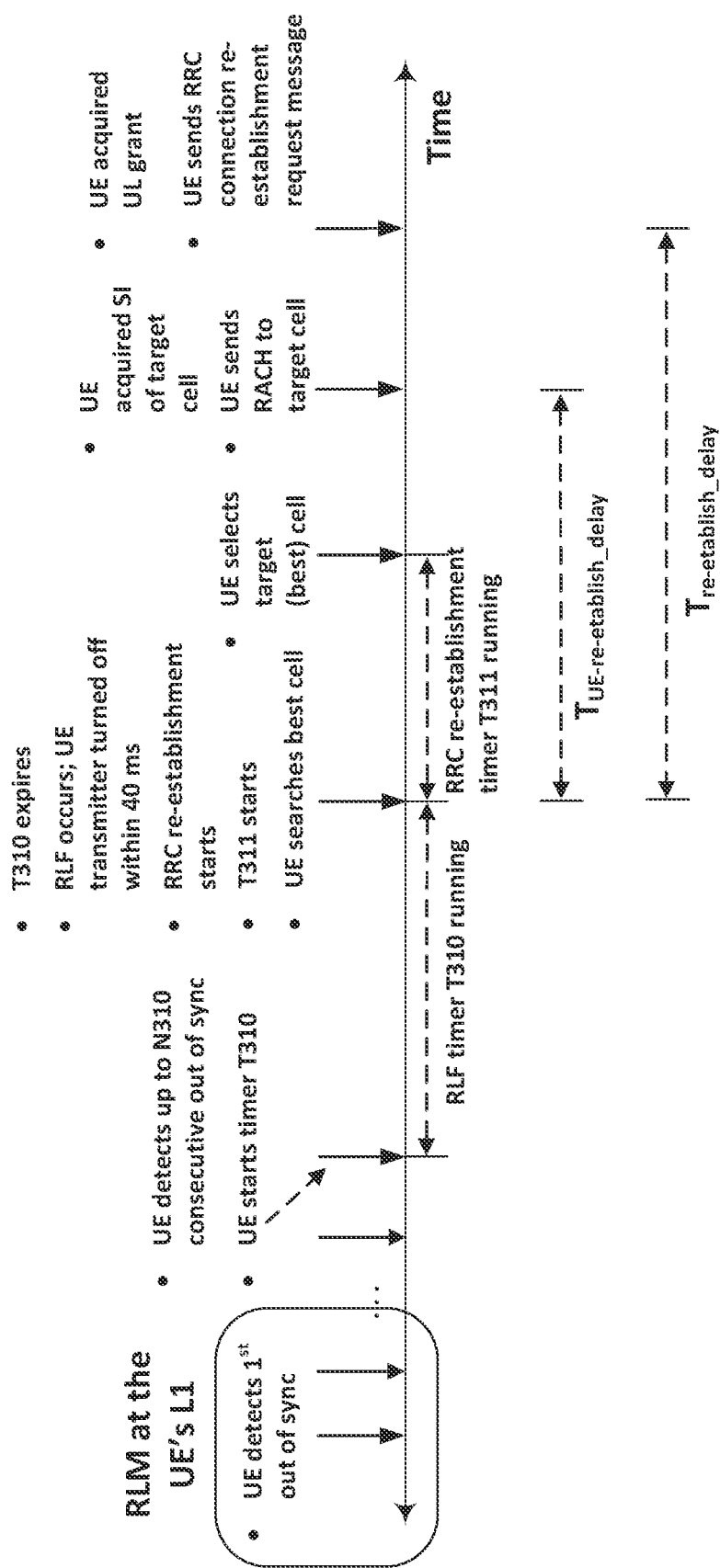
FIG. 2 illustrates higher layer RLM procedures in LTE.
Figure 3:
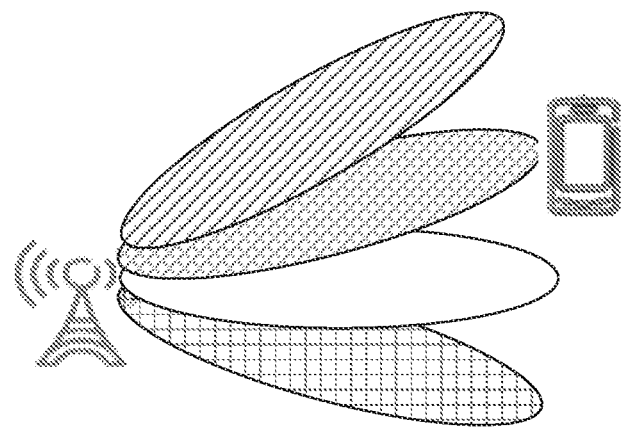
FIG. 3 illustrates a beam sweeping procedure.

As described above, common signals and channels in LTE are transmitted in an omnidirectional manner, i.e., without beamforming. That is the not the case in NR, with the availability of many antennas at the base station and the different ways they can be combined to beamform signals and channels. The major consequence of the massive usage of beamforming in NR is that while in LTE it was quite clear that the CRSs quality could be used to estimate the quality of PDCCH, in NR this becomes unclear, due to the different ways channels and reference signals can be beamformed. In other words, it cannot be assumed as a general matter that any particular reference signal will be transmitted in the same way as the PDCCH is transmitted. This ambiguity from the UE's point of view is due to that reference signals and channels can be transmitted by the network via different kinds of beamforming schemes, which are typically determined based on real-time network requirements. These requirements may include, for example, different tolerance levels to radio overhead due to reference signals versus control channels, or different coverage requirements for reference signals versus control channels.

Despite these two challenges from NR design principles, an NR UE in connected mode still needs to perform RLM, to verify whether its cell quality is still good enough so that the UE can be reached by the network. Otherwise higher layers should be notified, and UE autonomous actions should be triggered.

A first proposed solution for RLM in networks where beamforming is used includes a UE performing RLM by performing Radio Resource Management (RRM) measurements based on the same periodic RSs configured to support connected mode mobility. At the network side, the radio access node transmits downlink control channel information in the same way it transmits these reference signals to be reused for RLM purposes. In this context, "performing RLM" means performing RRM measurements and comparing the value of a given metric, e.g., a radio signal Received Power (RSRP), with a threshold that represents the downlink control channel quality, e.g., in terms of Block Error Rate (BLER), under the assumption that the control channel would have been transmitted in the same manner, i.e., with similar beamforming properties and/or similar or representative frequency resources.

One aspect of this approach is that the network guarantees the correlation of the quality of the serving cell's beamformed RSs used for mobility measurements and the quality of the downlink control channel(s) obtained from non-reference-signal data. "Correlated with" here indicates that the frequency resources for the beamformed RSs are overlapping with or very close to those used for the downlink channel, within the overall possible bandwidth. This correlation is done at the network side by beamforming the downlink control channel information in the same beamforming configuration (e.g., direction, beam width, power distribution, same antenna panel, etc.) in the same manner it is transmitting the mobility RSs configured for that UE.

Figure 4:
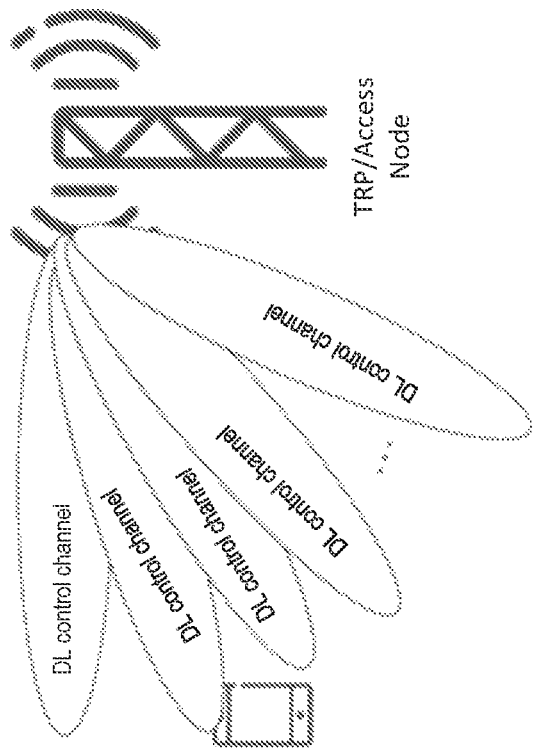
FIG. 4 illustrates the principles of a reference signal transmission that facilitates RLM procedures described herein, according to some embodiments.
Figure 4:
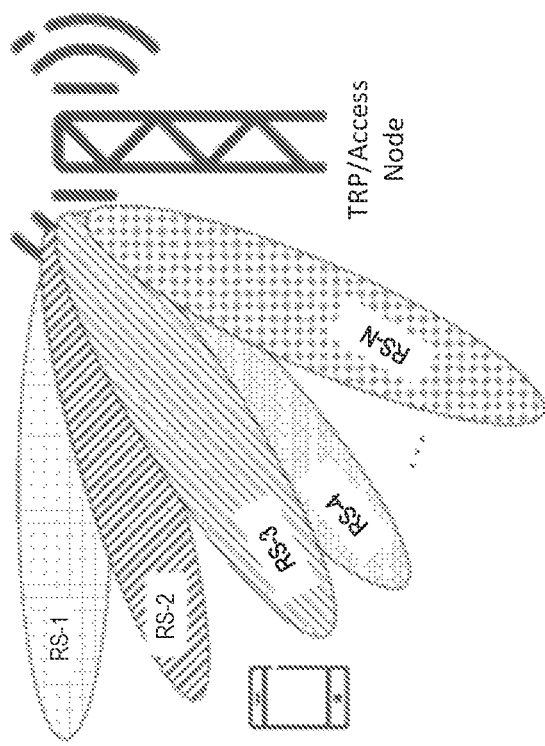

FIG. 4 illustrates principles of a reference signal transmission that facilitate the RLM performed by this example system. As seen on the left-hand side of FIG. 4, each beam carries RSs that are configured to the UE primarily for mobility purposes. What is meant by "configured to the UE" is that a connected-mode UE is provided with information regarding measurements and reporting conditions, with respect to serving cell/beam signals and/or non-serving cell/beam signals. These RSs may carry a beam identifier (ID), a beam ID plus a group ID (which may be understood as a cell ID, for example), or simply a group ID, in various embodiments. As seen on the right-hand side of FIG. 4, a downlink control channel, such as a PDCCH, is transmitted using the same beamforming properties as the RSs that are used for mobility purposes. This may be understood as transmitting the downlink control channel in the "same beam" as the RSs, even if transmitted at different times.

However, in order to fulfill requirements for RRM measurements, these beamformed RSs used for mobility measurements have been envisioned to be narrow band signals (e.g., six central physical resource blocks (PRBs)). On the other hand, the downlink control channel can either be transmitted in the whole band (as LTE PDCCH) or localized/distributed (as LTE ePDCCH and possibly the downlink control channel design in NR).

In a second proposed solution, the access node may perform RLM measurements based on a new signal that is a version of the beamformed RSs used for mobility measurements, but repeated in the frequency domain in the same frequency resources of the search space of the DL control channel of a given UE. These multiple versions of the beamformed RSs used for mobility may also be transmitted in different subframes in order to provide some additional time-domain diversity and/or to enable the beamforming transmission to be equivalent.

However, as the demodulation of PDCCH is still based on DMRS, there could possibly be a mismatch between the beamforming applied to the RSs used for mobility and the beamforming applied on PDCCH. Such a mismatch may be present even if the transmissions of both the RSs and PDCCH are configured on the same frequency resources.

In a third proposed solution, RLM can be based on a UE-specific RS, such as DMRS, since DMRS already needs to be configured on the same resources as PDCCH and transmitted with the same beamforming pattern so that PDCCH can be decoded reliably based on DMRS. In this configuration, such DMRS can accurately reflect the PDCCH quality and is therefore suitable for RLM.

However, DMRS is configured by the network only when UE is scheduled with PDCCH. The UE cannot monitor its radio link quality if no PDCCH is scheduled for that UE. To solve this issue, the third proposed solution may also include an instance where the UE is enabled to perform RLM in an opportunistic manner in a beam-based system, where the network may configure UE with a UE-specific RS transmission, even when the UE is not scheduled with any PDCCH. This UE-specific RS can be configured as a DMRS or as a dummy PDCCH transmission, which is transmitted on a UE-specific beamforming pattern. This solution provides high measurement accuracy for the RLM function; however, such gain in RLM performance comes at the cost of extra radio signaling overhead. This overhead can be detrimental to the network performance, especially if non-scheduled PDCCH durations are long and if there is a large number of RRC_CONNECTED UEs performing RLM measurements.

There are limitations when using a single RS configuration for RLM. The first and second proposed solutions rely solely on a single configuration of beamformed signals used for mobility and reused for RLM. When PDCCH and RSs used for mobility are both transmitted on similar resources through the same beamforming pattern, the RLM measurements can be performed accurately at UE. However, one of the essential benefits in a beam-based system is the dynamic and opportunistic UE-specific configuration of data and control channels. For example, a UE-specific narrow beamwidth pattern can be formed by the network to reach a distant connected-mode UE with high antenna directivity so that spectral efficiency can be maximized on data channels by fully taking advantage of the UE-specific propagation conditions. The control channel also needs to be coupled on the same beam pattern as the data channel to ensure that the data channel can be decoded at all times. Hence, RSs used for mobility as a single source cannot render accurate RLM performance in such beam-based networks where UE-specific beam patterns are configured opportunistically. In summary, the solutions based on beamformed RSs used for mobility require low signaling overhead; however, the accuracy of RLM measurements cannot be high in opportunistic beam-based networks with dynamic UE-specific beam configurations.

The third proposed solution relies solely on UE-specific RS (e.g., DMRS) for RLM. When UE is scheduled with PDCCH, there is no overhead, since the DMRS is transmitted anyway. However, when no PDCCH is scheduled by the network due to packet data inactivity, the opportunistic RLM solution may result in significant overhead. The amount of overhead can be especially high when a large number of RRC_CONNECTED UEs are required to perform RLM measurements. This issue cannot be avoided, since each active UE relies on a UE-specific RS to perform RLM according to the third proposed solution. In summary, the UE-specific RS based solution can ensure high RLM accuracy in a beam-based network; however, the signaling overhead may be too high in crowded beam-based networks especially when the traffic patterns of user data packets are intermittent and fragmented.

Therefore, it is recognized herein that the inherent limitations of using a single beamformed RS configuration during RLM measurements provides performance drawbacks in a beam-based system where lean signaling is an essential performance indicator. Each RS type has a clear superiority for RLM depending on different link and network conditions in a beam-based lean system.

Figure 5:
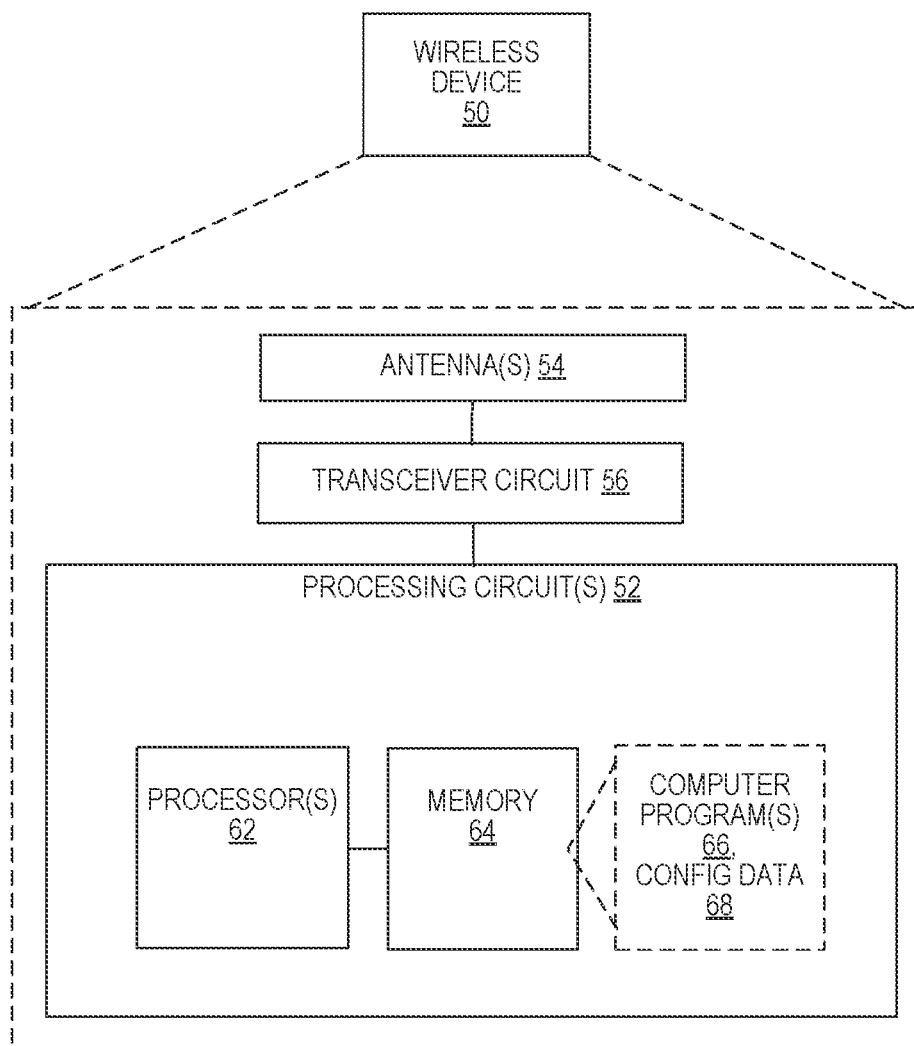
FIG. 5 is a block diagram of a wireless device, according to some embodiments.

FIG. 5 illustrates a diagram of the corresponding wireless device, shown as wireless device 50, according to some embodiments. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio network node or base station in a wide-area cellular network via antennas 54 and a transceiver circuit 56. The transceiver circuit 56 may include transmitter circuits, receiver circuits, and associated control circuits that are collectively configured to transmit and receive signals according to a radio access technology, for the purposes of using cellular communication services. This radio access technology is NR for the purposes of this discussion.

The wireless device 50 also includes one or more processing circuits 52 that are operatively associated with the radio transceiver circuit 56. The processing circuit 52 comprises one or more digital processing circuits 62, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50. The processing circuit 52 may be configured, e.g., through the use of appropriate program code stored in memory 64, to carry out one or more of the methods and/or signaling processes detailed hereinafter.

The processing circuit 52 of the wireless device 50 is configured, according to some embodiments, to perform measurements based on a plurality of RLM sources (inclusive of any beam-failure detection sources) received in beam-formed downlink signals, where the measurements indicate a quality of a given cell or beam. The plurality of RLM measurement sources comprises two or more of: one or more first RSs, one or more second RSs different than the first one or more RSs, e.g., of a different type than the one or more first RSs, and one or more physical channel quality indicators obtained from non-reference-signal data in the beam-formed downlink signals. The processing circuit 52 is also configured to, for each of a plurality of evaluation periods and for each of the plurality of RLM measurement sources used to perform measurements, determine whether a measurement for the respective RLM measurement source indicates an out-of-sync event in response to the measurement being below a first threshold or determine whether the measurement for the respective RLM measurement source indicates an in-sync event in response to the measurement being above a second threshold. The processing circuit 52 is further configured to perform one or more RLM actions (inclusive of any beam-failure detection actions) based on determined occurrences of in-sync and/or out-of-sync events.

Figure 6:
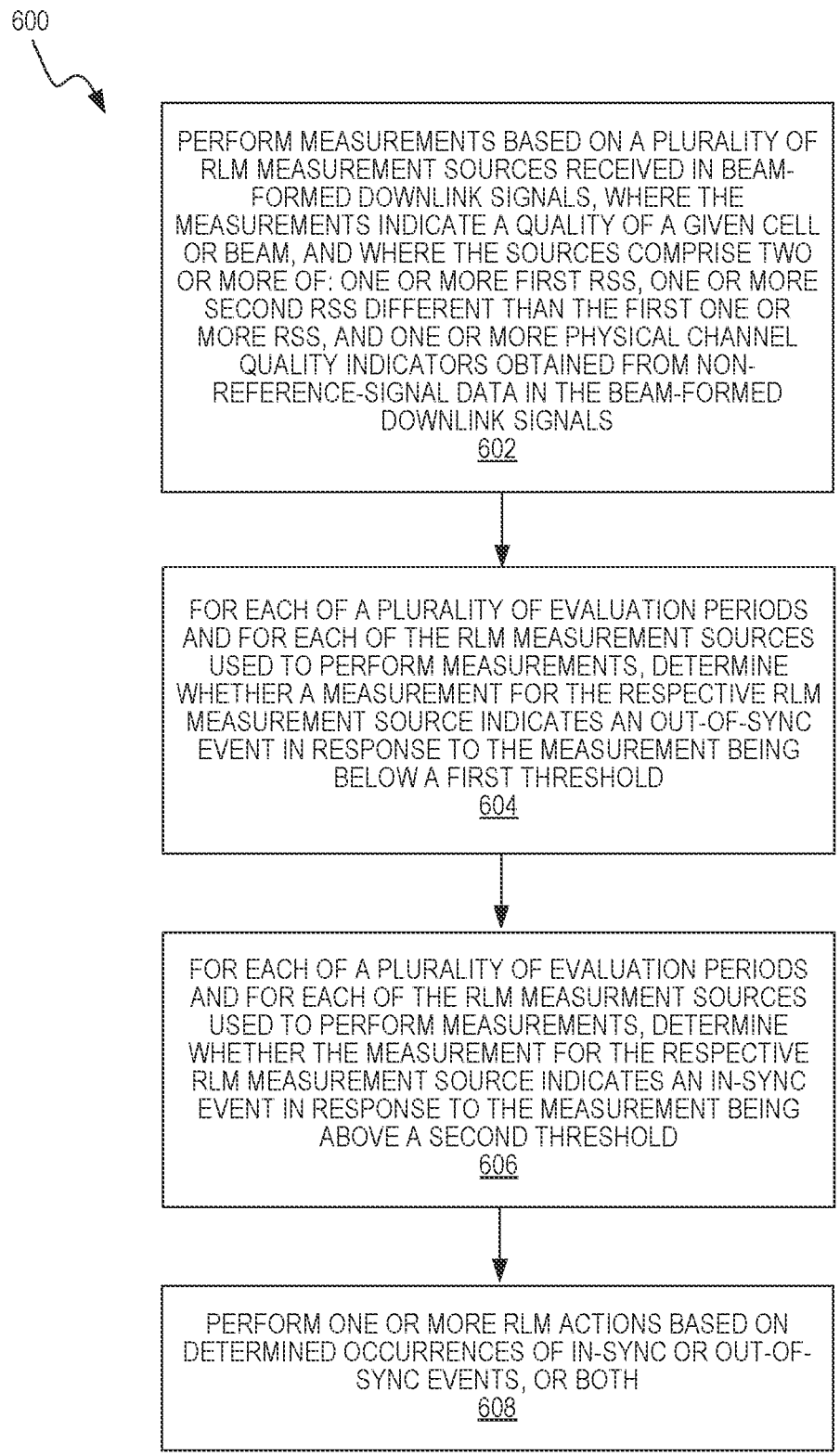
FIG. 6 illustrates a method in the wireless device, according to some embodiments.

According to some embodiments, the processing circuit 52 is configured to perform a method 600, as shown in FIG. 6. The method 600 includes performing measurements based on a plurality of RLM measurement sources received in beam-formed downlink signals, where the measurements indicate a quality of a given cell or beam (block 602). The plurality of RLM measurement sources comprises two or more of: one or more first RSs, one or more second RSs different than the first one or more RSs, and one or more physical channel quality indicators obtained from non-reference-signal data in the beam-formed downlink signals. The method 600 also includes, for each of a plurality of evaluation periods and for each of the plurality of RLM measurement sources used to perform measurements, determining that a measurement for the respective RLM measurement source indicates an out-of-sync event in response to the measurement being below a first threshold (block 604). Likewise, the method may also include, for each of a plurality of evaluation periods and for each of the plurality of RLM measurement sources used to perform measurements, determining that the measurement for the respective RLM measurement source indicates an in-sync event in response to the measurement being above a second threshold (block 606). In some cases, blocks 604 and 606 may be considered part of a broader step of determining whether to declare RLF or beam detection failure. A broader step may also include determining whether each measurement indicates an in-sync event or an out-of-sync event. The method 600 further includes performing one or more RLM actions based on the measurements. This may include performing an RLM action based on determined occurrences of in-sync and out-of-sync events (block 608).

In various cases, the plurality of RLM measurement sources may comprise any DMRSs or physical channel quality indicators. For example, RLM measurement sources may include DMRSs used for a physical control channel region of the beam-formed downlink signals in combination with one or more of primary synchronization signals (PSSs), secondary synchronization signals (SSSs), tertiary synchronization signals (TSSs), and DMRSs used for a physical broadcast channel (PBCH). The DMRSs may be used for the physical control channel region in combination with one or more of CSI-RSs, beamformed RSs used for mobility, and beam measurement reference signals (BRSs). RLM measurement sources may also include a physical channel quality indicator obtained from non-reference-signal data in the beam-formed downlink signals in combination with the one or more of PSSs, SSSs, TSSs and DMRSs used for the PBCH. The physical channel quality indicator may be used in combination with the one or more of CSI-RSs, beamformed RSs used for mobility, and BRSs.

Performing the RLM action based on the determined occurrences of in-sync and/or out-of-sync events may comprise performing a first RLM action in response to determining that a threshold number of consecutive out-of-sync events has occurred and performing a second RLM action in response to determining that a threshold number of consecutive in-sync events has occurred. In one example, the first RLM action comprises starting a timer and the second RLM action comprises stopping the timer. In another example, one of the first and second RLM actions comprises providing higher layer notifications or declaring RLF and/or declaring beam failure.

In some embodiments, the threshold number of consecutive out-of-sync events and the threshold number of consecutive in-sync events are established separately for each RLM measurement source of the plurality of RLM measurement sources. In other embodiments, the threshold number of consecutive out-of-sync events and/or the threshold number of consecutive in-sync events for one or more of the plurality of RLM measurement sources is shared by a different RLM measurement source.

As can be seen, there may be several parameters involved in these embodiments: an out-of-sync measurement threshold (Qout); an in-sync measurement threshold (Qin); an out-of-sync occurrence number threshold (N1); an in-sync occurrence number threshold (n2); and a timer value (T1). Different sources can use either of the parameters, or different parameters. And each different source can have its own procedure during RLM or alternatively different RLM measurement sources can be used in one procedure during RLM.

In the embodiments described herein, only RLM is mentioned for simplicity, but RLM is meant to include beam failure detection as a form of RLM, as mentioned above.

The method 600 may include receiving configuration information for one or more of the plurality of RLM measurement sources and performing the measurements based on the configuration information.

There may be different methods for performing the measurements for RLM (and beam failure detection). In a first alternative method, the wireless device (e.g., UE) monitors its configured PDCCH and, if data is scheduled in a given subframe, the UE should opportunistically use PDCCH DMRSs to compute a quality estimate. This may be an SINR value that is further averaged over multiple PDCCH occasions in a pre-defined interval called an evaluation period, which may be, for example, X radio frames (e.g., 20 radio frames=200 ms). At the same time, within the same evaluation period, the UE may measure an additional source, which in the case of measuring a first source, could mean measuring an SS Block RS (e.g. PSS/SSS/TSS or DMRS for PBCH). In the case of measuring the second source, this could be CSI-RSs so the UE also generates an averaged quality estimate (e.g., SINR associated to the additional sources over the same period). Hence, in this first alternative, for each RLM evaluation period, there will be one average quality estimate, such as one SINR estimate per source.

In an embodiment of this first alternative, the method 600 may include performing the measurements based on the plurality of RLM measurement sources, where this includes monitoring a control channel region of one or more of the beam-formed downlink signals and associated with a control channel message for the wireless device. In response to determining that data is scheduled in a given subframe of the control channel region, the method may include determining, during an evaluation period, a first measurement by computing a first quality estimate using one or more first RSs, wherein the first RSs are DMRSs in the control channel region. The method may further include determining, during the evaluation period, a second measurement by computing a second quality estimate using the one or more second RSs, wherein the one or more second RSs are one of: one or more PSSs; one or more SSSs, one or more TSSs, one or more DMRSs used for a PBCH, one or more of CSI-RSs, one or more beamformed RSs used for mobility, and one or more BRSs. The first quality estimate may be computed as an average of first radio signal metrics measured from the one or more first RSs over the evaluation period, and the second quality estimate may be computed as an average of second radio signal metrics measured from the one or more second RSs over the evaluation period.

Figure 7:
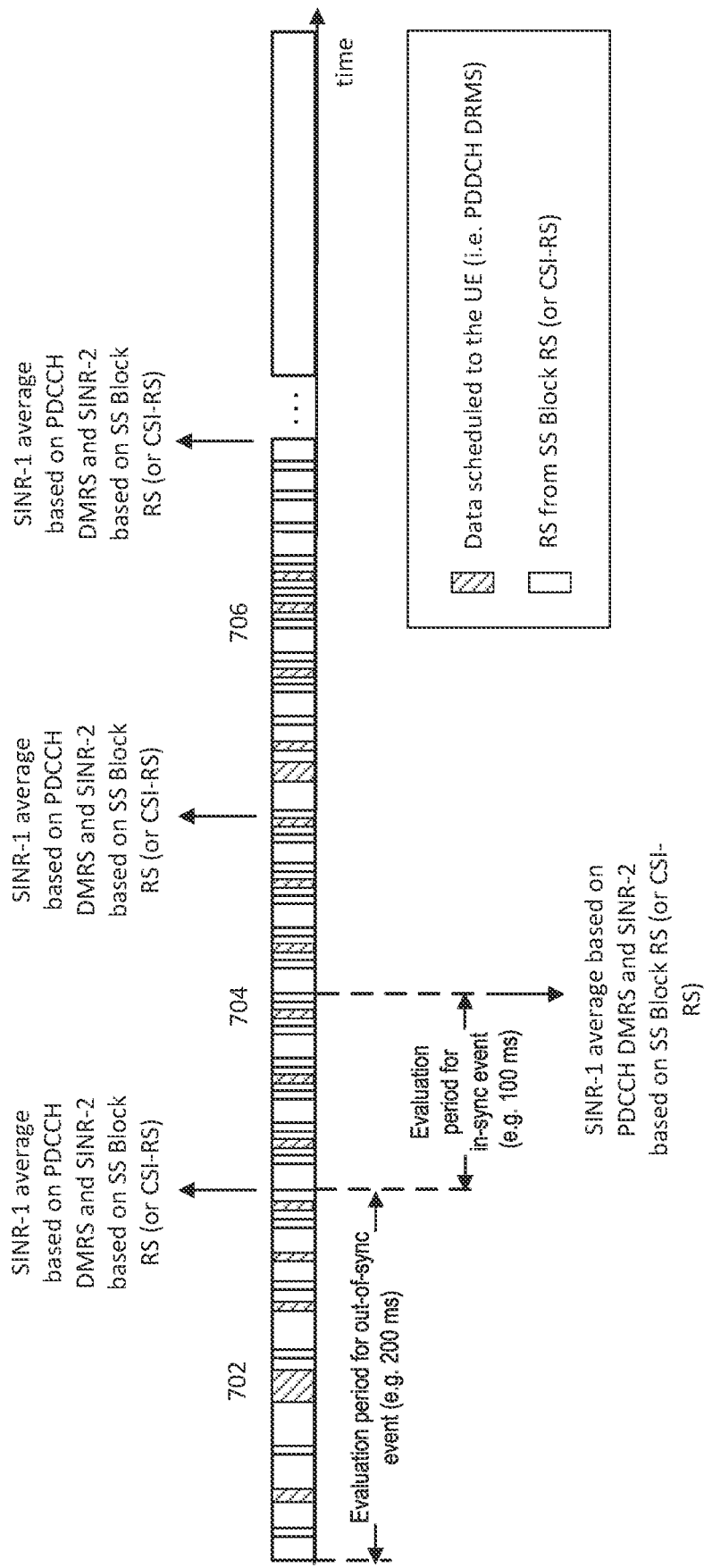
FIG. 7 is a diagram illustrating one SINR per source that is generated per evaluation period, according to some embodiments.
Figure 8:
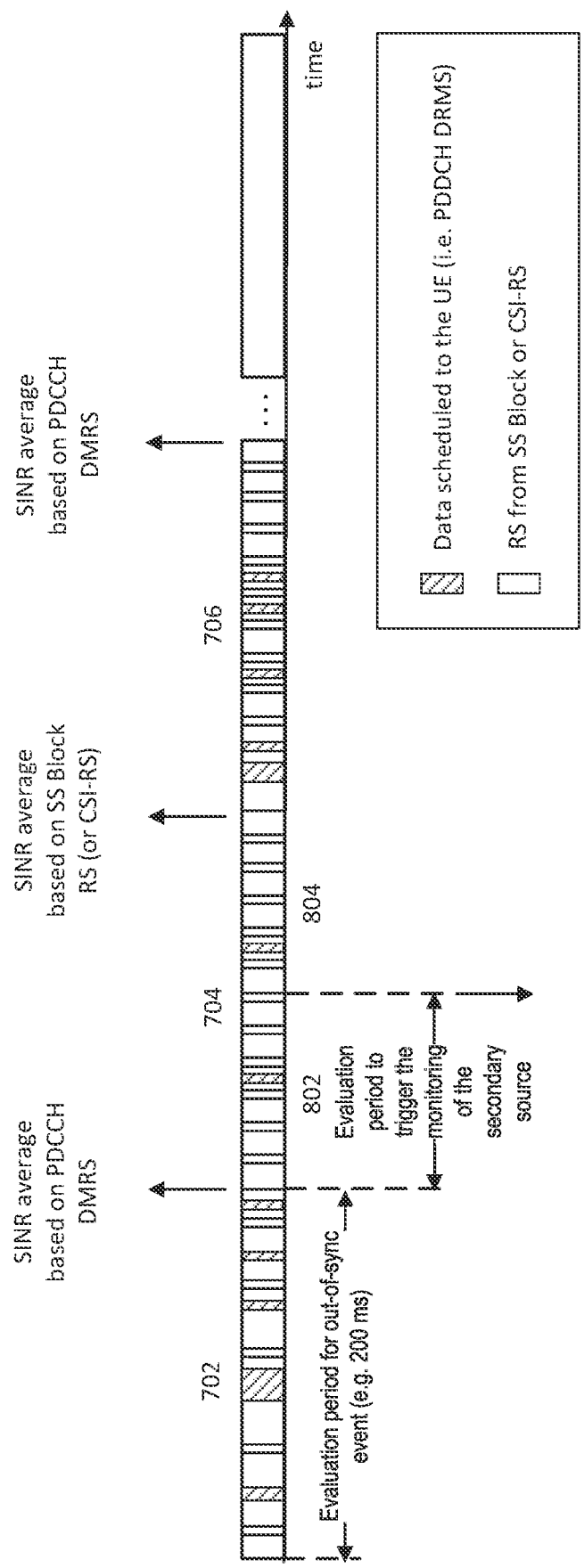
FIG. 8 is a diagram illustrating one SINR that is generated per evaluation period, although a different source could be used per evaluation period, according to some embodiments.

This quality estimate, or average quality estimate, may be an SINR. FIG. 7 shows the generation of one SINR per source per evaluation period. For example, FIG. 7 shows evaluation periods 702, 704 and 706. In other words, if K sources are defined there will be K SINR values per period. One aspect of this embodiment is that K quality estimates (e.g., SINR values) are generated for K RLM sources per measurement evaluation period. In current systems, only a single quality estimate based on a single source is generated (the CRS in the case of LTE). FIG. 8 shows an embodiment where one SINR is generated per evaluation period, although a different source could be used per evaluation period. For example, in a first evaluation period 702 PDCCH DMRS is used to calculate a SINR average. In the next evaluation period 704, SS Block RS or CSI-RS is used.

In a second alternative for performing the measurements for RLM, the notion of primary RLM source and secondary RLM sources is introduced. In this embodiment, the UE will always start performing RLM associated to the primary RLM source to perform RLM measurements and, if that is not present or does not provide sufficient samples, the UE should use secondary sources. For example, PDCCH DMRS could be the primary source, possibly available only when data is being scheduled to the UE. Then, when monitoring PDCCH, the UE should detect whether the number of PDCCH occurrences are likely sufficient (i.e., above a configurable threshold) within a given time interval from the beginning of the evaluation period (e.g., first X radio frames). This is shown by interval 802 in evaluation period 704 of FIG. 8. If they are sufficient (e.g., PDCCH occasions within the first X radio frames meet the threshold), the UE should keep using it as the RLM source for that measurement evaluation period 704, or at least the remainder 804 of the evaluation period 704. If the number of occurrences during the interval 802 is not sufficient (e.g., PDCCH occasions within the first X radio frames lower than threshold), the UE should start searching for additional expected source(s). The UE will then perform quality estimation, such as SINR estimation, for that same measurement evaluation period 704, now based on the secondary source(s), which may have been selected based on a number of factors, such as current measurements, past measurements, historic reliability, what other sources may be available or detected, etc. Hence, in this second alternative, for each measurement evaluation period, there will be a single quality estimation, such as an SINR estimation, which can be either associated to the primary or secondary source(s).

Note that in current systems, a single source is always used (CRS in LTE). One aspect of the embodiment is that quality estimates, such as SINR estimates, for each measurement evaluation period may have been generated based on different RLM sources. For example, while in the first period 702, the DMRS for PDDCH is used (since there was scheduled data), in the second evaluation period 704 NR-SS or CSI-RS are used as there are not enough samples from DMRS of PDCCH.

Accordingly, in some embodiments, the processing circuit 52 of the wireless device 50 is configured to perform method 900. The method 900 includes performing, during a first time interval of an evaluation period, measurements using a RLM measurement source received in beam-formed downlink signals, where the measurements indicate a quality of a given cell or beam (block 902). The RLM measurement source comprises one of: one or more first RSs, one or more second RSs different (e.g., of a different type) than the first one or more RSs, and one or more physical channel quality indicators obtained from non-reference-signal data in the beam-formed downlink signals. The method 900 also includes determining a number of occurrences of the source during the first time interval from the beginning of the evaluation period (block 904). The method 900 includes, in response to determining that the number of occurrences has met an occurrence threshold, continuing to perform the measurements using the source as a primary source for the remainder of the evaluation period (block 906) and, in response to determining that the number of occurrences has not met the occurrence threshold, selecting, as a secondary source, a different one of the one or more first RSs, one or more second RSs and one or more physical channel quality indicators obtained from non-reference-signal data in the beam-formed downlink signals, and instead performing measurements using the secondary source for the remainder of the evaluation period (block 908). The method 900 further includes performing one or more RLM actions based on the measurements performed using at least one of the primary and secondary sources (block 910).

Performing the measurements using the primary source may include computing a first quality estimate for the evaluation period from one or more first radio signal metrics obtained from the primary source, and performing the measurements using the secondary source may include computing a second quality estimate for the evaluation period from one or more second radio signal metrics obtained from the secondary source. The method 900 may then further include performing the one or more RLM actions based on the first quality estimate in response to determining that the number of occurrences has met the occurrence threshold and performing the RLM actions based on the second quality estimate in response to determining that the number of occurrences has not met the occurrence threshold.

In various cases, the primary source is one or more DMRS in a control channel region of the beam-formed downlink signals, and the secondary source is one of: one or more PSSs; one or more SSSs, one or more TSSs, one or more DMRSs used for a PBCH, one or more of CSI-RSs, one or more MRSs, and one or more BRSs. In some cases, the sources used for the primary and secondary sources may be switched.

In a third alternative for performing measurements for RLM, after detecting that the primary source may not provide enough occasions and starting to use the secondary source, the UE does not discard the samples but rather waits for further or new occurrences of the primary source. If there are a sufficient number of new occurrences, at the end of the period, the UE will generate two SINRs, one associated with the primary source and another associated with the secondary source(s). Here, there can either be a single SINR value that is generated per period or multiple SINR values per period. In the case of a single source, that source may change per period.

Accordingly, in some embodiments, the method 900 includes, in response to determining a threshold number of new occurrences of the primary source have occurred during the evaluation period after beginning to perform the measurements using the secondary source, continuing with performing the measurements using the primary source for the evaluation period. Performing the RLM actions based on the measurements may include selecting whether to use the measurements performed using the primary source. The measurements may be performed using the secondary source, or both, based on the respective measurements, and performing the RLM actions based on the selection.

For any of these alternatives, in the case that the secondary source is a signal transmitted in the synchronization signal (SS) Block Set, the UE can expect that signal once it has detected the absence of DMRS for PDCCH. In the case of CSI-RS, the UE may need to wait for its occurrence within that radio frame, depending on the CSI-RS configuration for its serving cell. In some cases, the UE does not really perform SINR averages for PDCCH but uses other quality indications, such as the CQI reports associated to that specific scheduled subframe (possibly over multiple resource elements in the frequency domain within the PDCCH search space). However, if PDCCH is equally not present, the triggering to search additional sources in the serving cell can be similar.

Note that although the first step described above is one in which the UE performs measurements, prior to performing measurements, the UE may have been provided with a measurement configuration associated to RLM by the network, for example, at the moment it connects to the cell (upon transition to RRC_CONNECTED or via a handover). In the case of PDCCH DMRS, the UE could be provided with a subset of the time intervals of its PDCCH search space. In the case of the additional sources being the NR-SS, the UE can be configured with time-domain filtering parameters which may be different from the ones used for mobility measurements events (e.g., A1-A6 or equivalent). In the case that the CSI-RS is used as an additional RLM source, the UE may receive an additional configuration only for RLM purposes, which gives the flexibly to the network to match the PDCCH search space in the frequency domain with the CSI-RS occurrence for RLM (also beamformed in the same way the network would beamform PDCCH). For example, the CSI-RS used for beam management may be transmitted quite often and with a certain bandwidth BW CSI-RS, while the UE may be configured for RLM to measure on specific part of the CSI-RS bandwidth that matches that of the PDCCH.

Therefore, in some embodiments, the method 900 includes the wireless device receiving configuration information from the network for one or more of the plurality of RLM measurement sources and performing the measurements based on the configuration information. In other embodiments, the method 900 includes receiving configuration information for at least one of the primary and secondary sources and performing the measurements based on the configuration information.

There may be various methods for mapping RLM measurements to either in-sync or out-of-sync events. Once averaged SINR (or other quality metric) measurements are available per RLM source within a given RLM measurement evaluation period, the UE maps the SINR (or other quality estimates) value or values per source into in-sync and out-of-sync events per evaluation period. This step may involve at least two different alternatives. In one alternative, the UE has a single quality estimate, such as an SINR estimate, per evaluation interval (or any other pre-defined RLM time interval). The single quality estimate will have been generated from or will be associated with one of the multiple sources. In another alternative, the UE has one quality estimate per RLM source per evaluation interval (or any other pre-defined RLM time interval), one per source that was used to generate it.

In the case of a single quality estimate per evaluation period, when no discontinuous reception (DRX) is configured, the UE triggers one out-of-sync event for each evaluation period when the single quality estimate becomes worse than a configured threshold (Qout). Similarly, without DRX, the in-sync is triggered when the quality estimate becomes better than a configured threshold (Qin). Upon detection of an out-of-sync event in a measurement evaluation period, the UE initiates the evaluation of in-sync (within another in-sync evaluation period which can be shorter). The occurrences of out-of-sync and in-sync are reported internally by the UE's physical layer to its higher layers, which in turn may apply layer 3 (i.e., higher layer) filtering for the evaluation of RLF.

In a first approach, the thresholds Qin and Qout are configured per evaluation period, regardless of which source is being used. Hence, RLM recovery actions may be triggered based on mixed occurrences of out-of-sync events, possibly from multiple sources. The occurrences of out-of-sync and in-sync are reported internally by the UE's physical layer to its higher layers regardless which RLM source was responsible to increment the out-sync and in-sync events.

According to this first approach, an embodiment of a method for performing the RLM actions based on the measurements may include determining that a measurement obtained for whichever one of the primary or secondary sources was used for the remainder of the evaluation period indicates an out-of-sync event in response to the measurement being below a first threshold or determining that the measurement indicates an in-sync event in response to the measurement being above a second threshold. The method may then include performing an RLM action based on determined occurrences of in-sync and out-of-sync events.

In a second approach, the thresholds Qin and Qout are configured per evaluation period, regardless of which source is being used. However, the increments are done per RLM source. Hence, RLM recovery actions may be triggered based on occurrences of out-of-sync events per source although threshold values are the same. The occurrences of out-of-sync and in-sync are reported internally by the UE's physical layer per source to its higher layers.

According to this second approach, an embodiment of performing the RLM measurement actions based on the measurements includes, for each RLM measurement source used to perform measurements, determining that a measurement for the respective RLM measurement source during the evaluation period indicates an out-of-sync event in response to the measurement being below a first threshold and determining that the measurement for the respective RLM measurement source during the evaluation period indicates an in-sync event in response to the measurement being above a second threshold. The method then includes performing one or more RLM actions based on determined occurrences of in-sync and out-of-sync events.

In some embodiments, performing the RLM actions based on the determined occurrences of in-sync and out-of-sync events includes performing a first RLM action in response to determining that a threshold number of consecutive out-of-sync events has occurred and performing a second RLM action in response to determining that a threshold number of consecutive in-sync events has occurred. The first RLM action may include triggering a timer and the second RLM action may include stopping the timer. In other embodiments, one of the first and second RLM actions comprises providing higher layer notifications, declaring RLF or declaring beam failure.

In some cases, the threshold number of consecutive out-of-sync events and the threshold number of consecutive in-sync events are established separately for each of the primary and secondary sources.

In a third approach for this step of performing the RLM actions, the thresholds Qin and Qout are configured per evaluation period and per RLM measurement source. That is, there can be different values per RLM measurement source so that for a given quality estimate, such as a given SINR estimate, an out-of-sync event for one RLM measurement source may increment but not for the other. As in the second approach, the increments are done per RLM measurement source. Hence, RLM recovery actions may be triggered based on occurrences of out-of-sync events per source and different threshold can apply since actions can also be different, depending on the higher layers. The occurrences of out-of-sync and in-sync are reported internally by the UE's physical layer per source to its higher layers, which in turn may apply higher layer filtering for the evaluation of RLF.

In some cases, at least one of the threshold number of consecutive out-of-sync events and the threshold number of consecutive in-sync events for one of the primary and secondary sources is shared by a different RLM measurement source than the primary and secondary sources.

Multiple (per source) quality estimates may be made per evaluation period (i.e., multiple SINR values). In a first example of multiple quality estimates, such as multiple SINR estimates per evaluation period, the UE selects a single quality estimate (SINR estimate) per evaluation period. To detect an out-of-sync or an in-sync event, the UE may combine the quality estimates from the sources. The previous description based on the usage of a single quality estimate (SINR estimate) per period described above may also apply to this approach.

In a second example, the UE can use the multiple quality estimates to increment out-of-sync and in-sync events per source, independently. Herein, the second and third approaches of the single quality estimate per evaluation period case also apply except that instead of one increment per period there can be multiple, one per source depending on each quality estimate.

Performing an action may include the UE generating or monitoring RLM-related events (e.g., starting a timer, notification to higher layers, RLF declaration, etc.) depending on the occurrences of in-sync and out-sync events. The determined increments of out-of-sync events and in-sync events may be reported to higher layers, where thresholds for the maximum number of events are configured. The UE may be able to verify, for each period, whether the number of out-of-sync events are higher than pre-defined threshold(s) N1 so that a timer T1 can be triggered or whether the number of in-sync events are higher than another threshold(s) N2 which indicates a link recovery so that timer T1 can be stopped.

According to the different approaches described above, higher layers may be provided with occurrences of out-of-sync or in-sync events per measurement evaluation period or occurrences of out-of-sync or in-sync events per measurement evaluation period per RLM measurement source.

In the case that events are informed per period only, the higher layers will have two thresholds configured, N1 for out-of-sync events and N2 for in-sync events, and timer T1 that is triggered when N1 out-of-sync event are satisfied and stopped when N2 in-sync events are satisfied. If timer T1 expires, the UE can trigger recovery actions.

In the case that events are informed per period and per source to the higher layers there is the possibility to have multiple thresholds configured, like N1 for out-of-sync events and N2 for in-sync events and timer T1 per source. By doing that, the UE and the network have the possibility to define thresholds and actions depending on the RLM measurement source where the issue has been detected. That is, there are multiple RLM procedures running without interaction with each other.

Another approach is that each source has its own N1 and N2, but there is only one timer T1 shared by all sources. When N1 out-of-sync events of source 1 is satisfied, timer T1 is triggered. When N2 in-sync events of source 2 is satisfied then timer T1 is stopped. That is, there are multiple RLM procedures running with interaction with each other.

Figure 10:
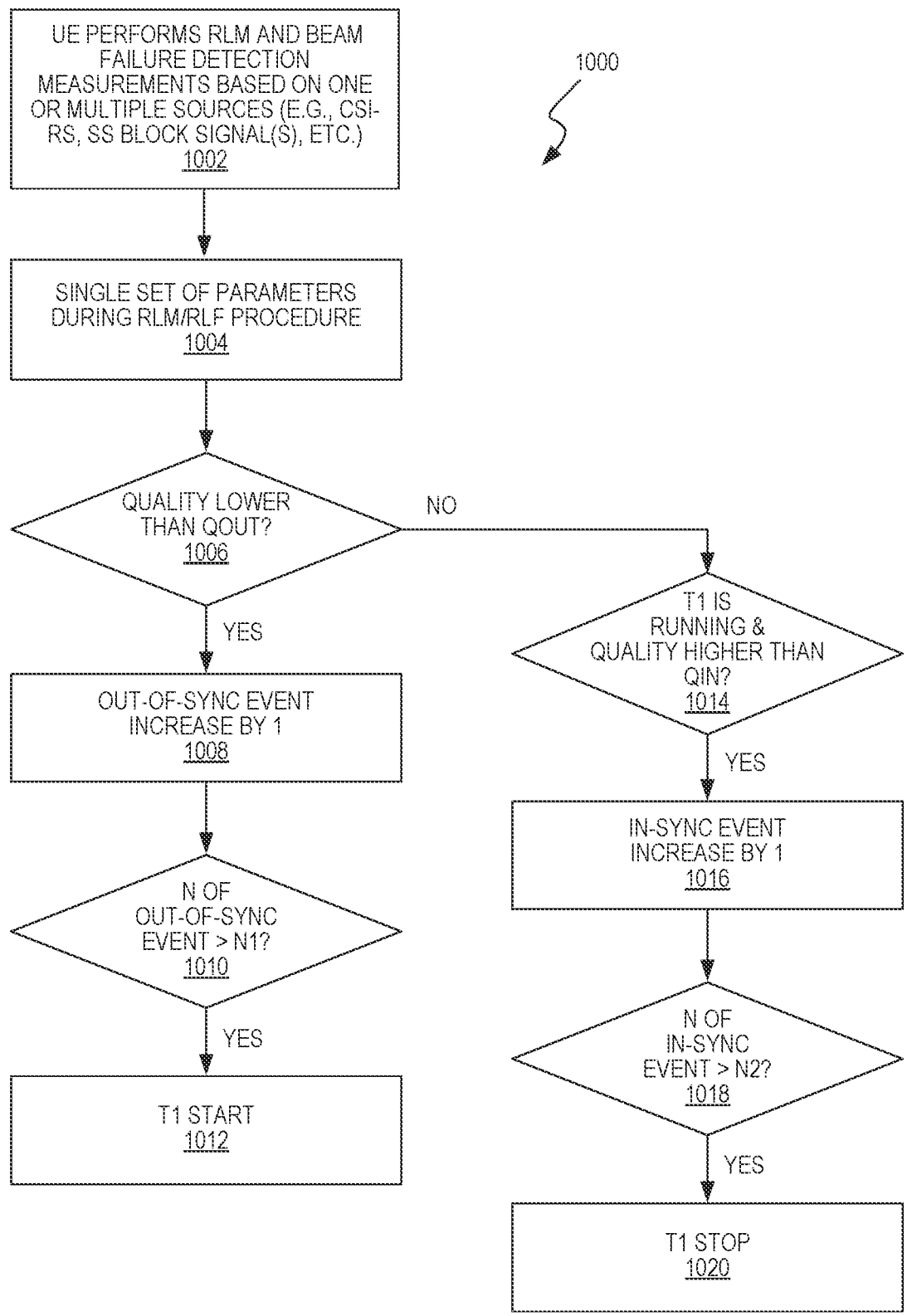
FIG. 10 is a flowchart illustrating the use of single set of parameters during an RLM/RLF procedure, according to some embodiments.
Figure 11:
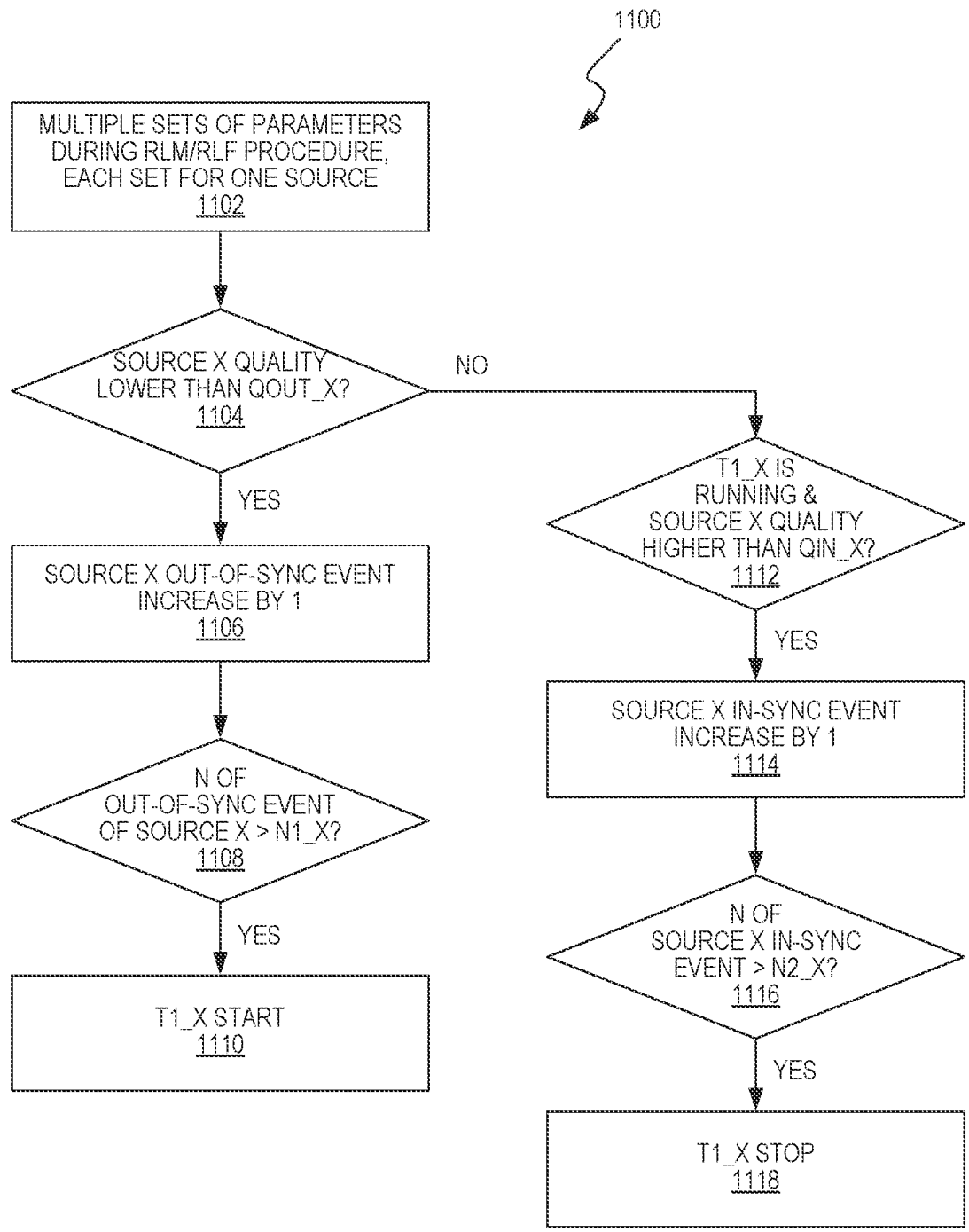
FIG. 11 is a flowchart illustrating the use of multiple sets of parameters during an RLM/RLF procedure, according to some embodiments.
Figure 12:
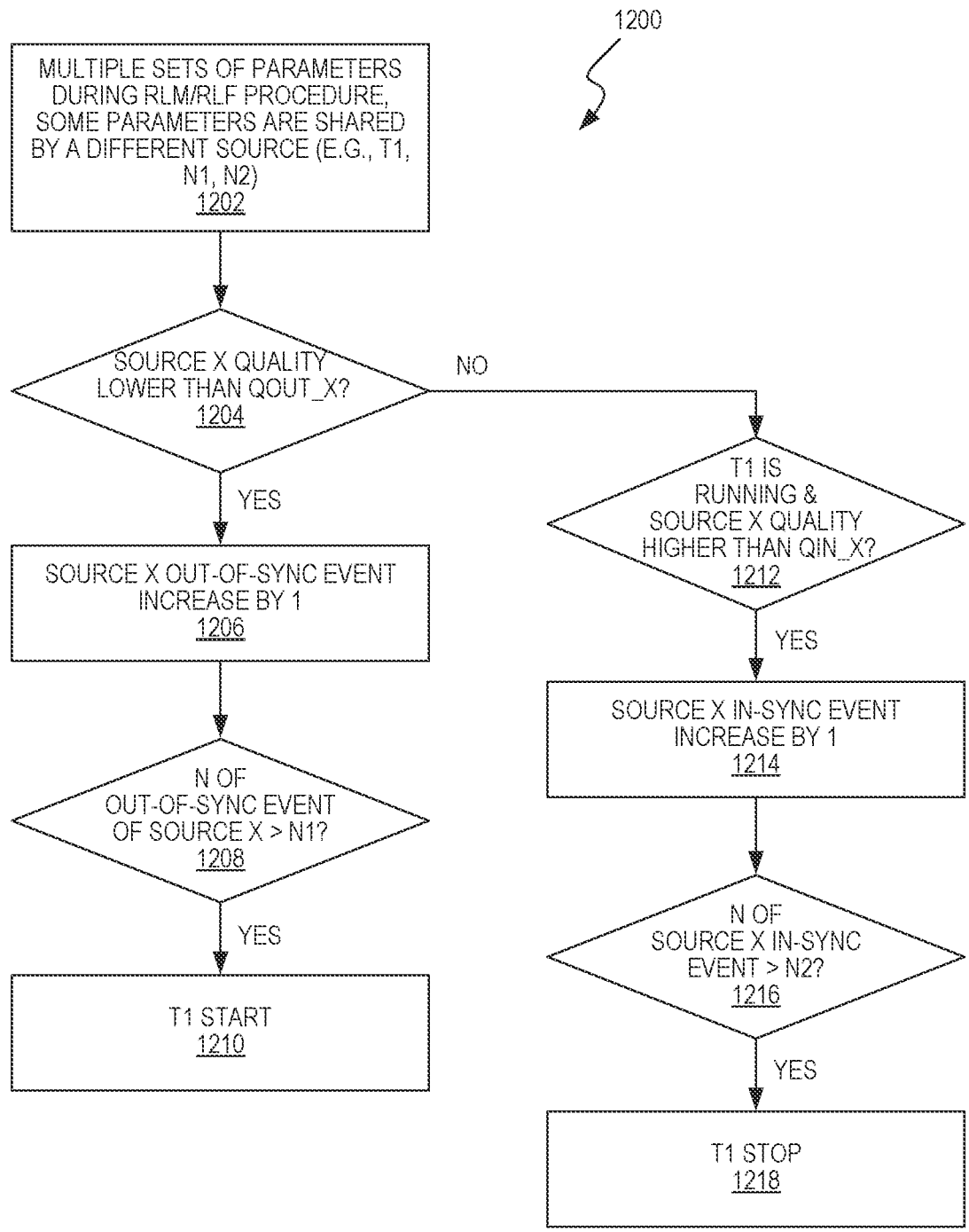
FIG. 12 is a flowchart illustrating the use of multiple sets of parameters during an RLM/RLF procedure, where some parameters are shared by a different source, according to some embodiments.

FIGS. 10-12 show some of these different variants of using multiple RLM measurement sources during an RLM procedure. FIG. 10 is the case when there is only one set of parameters used by all RLM measurement sources during an RLM/RLF procedure. FIG. 11 is another case when there are multiple sets of parameters used by each RLM measurement source independently. FIG. 12 shows an example in-between, where some parameters are shared by different source and some are used exclusively by a different source. Step 1002 in FIG. 10 shows, as representative for all of FIGS. 10-12, that the UE performs RLM measurements based on one or multiple sources (e.g., CSI-RS, SS block signals, etc.)

In more detail, FIG. 10 shows the UE using a single set of parameters during RLM/RLF procedure (block 1004). It is then determined whether the measurement or quality estimate is lower than an out-of-sync threshold (Qout) (decision 1006). If so, the out-of-sync event counter is incremented (block 1008). When it is determined (decision 1010) that the number of out-of-sync events meets a threshold number (N1), a timer T1 is started (block 1012).

If the measurement or quality estimate is not lower than an out-of-sync threshold (Qout) and, in fact, the measurement or quality estimate is determined (decision 1014) to be higher than an in-sync threshold (Qin), an in-sync event counter is incremented (block 1016). When it is determined (decision 1018) that the number of in-sync events meets a threshold number (N2), the timer T1 is stopped (block 1020).

In some embodiments, the UE declares RLF or beam failure when the quality of the first source falls below a first threshold or the second source falls below a second threshold (e.g., Qout, Qin, N1, N2). In some cases, the first and second thresholds are the same. In other cases, the first and second thresholds are different.

FIG. 11 shows the UE using multiple sets of parameters during RLM/RLF procedure, each set for one source, such as source X (block 1102). It is then determined whether the measurement or quality estimate for source X is lower than an out-of-sync threshold for source X (Qout_X) (decision 1104). If so, the out-of-sync event counter for source X is incremented (block 1106). When it is determined (decision 1108) that the number of out-of-sync events for source X meets a threshold number for source X (N1 X), a timer T1_X for source X is started (block 1110).

If the measurement or quality estimate for source X is not lower than an out-of-sync threshold for source X (Qout_X) and, in fact, the measurement or quality estimate is determined (decision 1112) to be higher than an in-sync threshold for source X (Qin_X), an in-sync event counter is incremented for source X (block 1114). When it is determined (decision 1116) that the number of in-sync events for source X meets a threshold number for source X (N2 X), the timer T1_X for source Xis stopped (block 1118).

FIG. 12 shows the UE using multiple sets of parameters during RLM/RLF procedure, where some parameters are shared by a different source (block 1202). It is then determined whether the measurement or quality estimate for source X is lower than an out-of-sync threshold for source X (Qout_X) (decision 1204). If so, the out-of-sync event counter for source X is incremented (block 1206). When it is determined (decision 1208) that the number of out-of-sync events for source X meets a threshold number (N1), the timer T1 is started (block 1210).

If the measurement or quality estimate for source X is not lower than an out-of-sync threshold for source X (Qout_X) and, in fact, the measurement or quality estimate is determined (decision 1212) to be higher than an in-sync threshold for source X (Qin_X), an in-sync event counter is incremented for source X (block 1214). When it is determined (decision 1216) that the number of in-sync events for source X meets a threshold number (N2), the timer T1 is stopped (block 1218).

Figure 13:
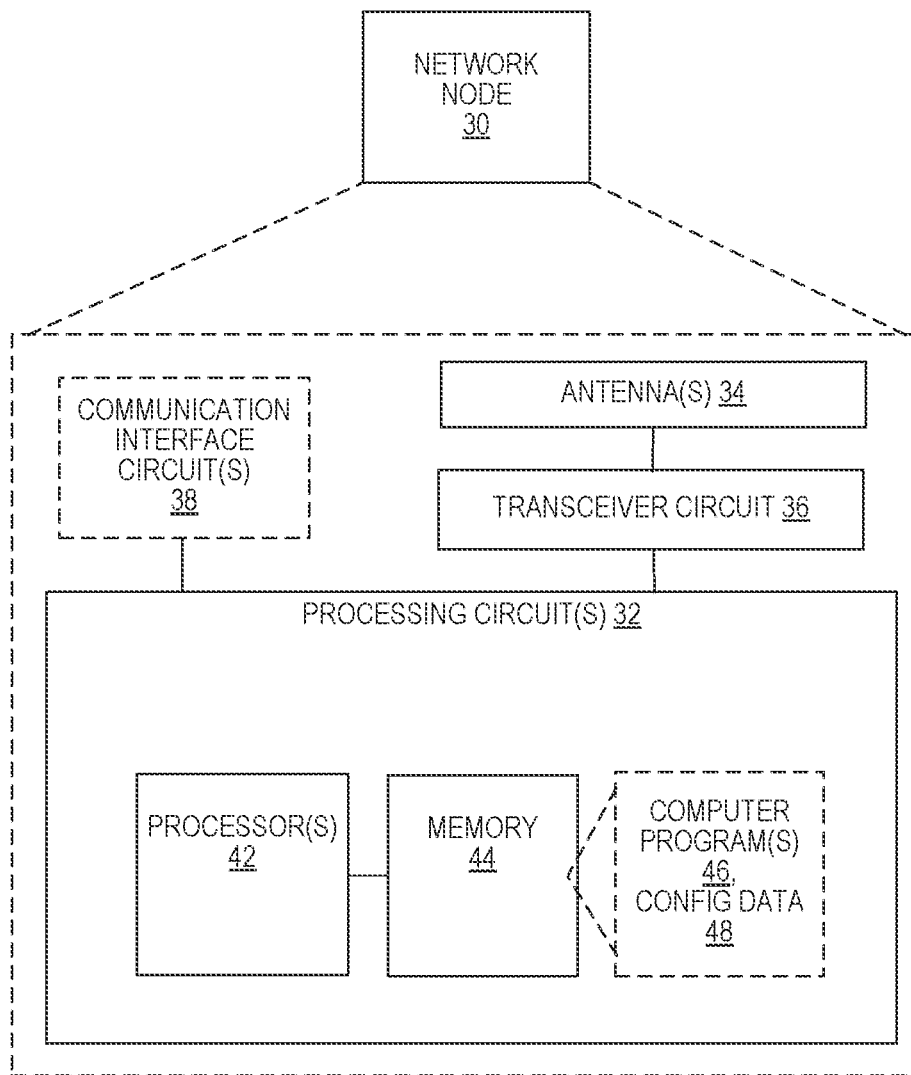
FIG. 13 is a block diagram of a network node, according to some embodiments.

FIG. 13 illustrates a diagram of a network node 30 that may be configured to carry out one or more of these disclosed techniques from the perspective of an access node of the wireless communications network. The network node 30 can be any kind of network access node, such as a base station, radio base station, base transceiver station, evolved Node B (eNodeB), Node B, or relay node. In the non-limiting embodiments described below, the network node 30 will be described as being configured to operate as a cellular network access node in an NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include a communication interface circuit 38 that includes circuitry for communicating with other nodes in the core network, radio nodes, and/or other types of nodes in the network for the purposes of providing data and/or cellular communication services. The network node 30 communicates with wireless devices using antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuit 36 and, in some cases, the communication interface circuit 38. For ease of discussion, the one or more processing circuits 32 are referred to hereafter as "the processing circuit 32" or "the processing circuitry 32." The processing circuit 32 comprises one or more digital processors 42, e.g., one or more microprocessors, microcontrollers, DSPs, FPGAs, CPLDs, ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the network access node 30. The processing circuit 32 may be configured, e.g., through the use of appropriate program code stored in memory 44, to carry out one or more of the methods and/or signaling processes detailed hereinafter.

The processing circuit 32 of the network node 30 is configured, according to some embodiments, to transmit, in beam-formed downlink signals, a plurality of RLM measurement sources, where the plurality of RLM measurement sources comprises one or more first RSs and one or more second RSs different than the first one or more RSs. It will be appreciated, in view of the above discussion, that the receiving wireless device may use one or both of these sources in conjunction with one or more physical channel quality indicators obtained from non-reference-signal data in the beam-formed downlink signals, in some embodiments. The processing circuit 32 is also configured to configure a wireless device to perform measurements based on a plurality of RLM measurement sources received in the beam-formed downlink signals, where the measurements indicate a quality of a given cell or beam. The wireless device is then enabled to perform one or more RLM actions based on occurrences of in-sync and out-of-sync events determined from the measurements.

Figure 14:
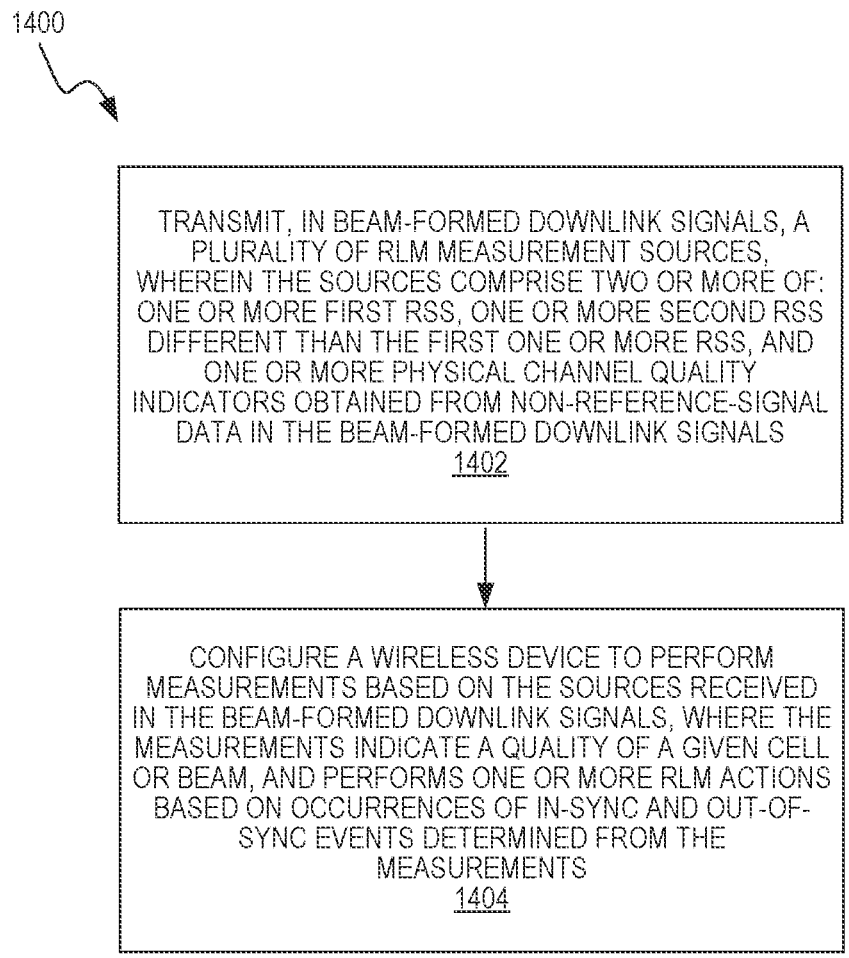
FIG. 14 illustrates a method in the network node, according to some embodiments.

Regardless of the physical implementation, the processing circuit 32 is configured to perform, according to some embodiments, a method 1400 in an access node of a wireless communications system, such as network node 30, as shown in FIG. 14. The method 1400 includes transmitting, in beam-formed downlink signals, a plurality of RLM measurement sources (block 1402), where the plurality of RLM measurement sources comprises one or more first RSs and one or more second RSs different than the first one or more RSs. The method 1400 also includes configuring a wireless device to perform measurements based on a plurality of RLM measurement sources received in the beam-formed downlink signals, where the measurements indicate a quality of a given cell or beam, and where the wireless device is enabled to perform one or more RLM actions based on occurrences of in-sync and out-of-sync events determined from the measurements (block 1404). The plurality of RLM measurement sources may include DMRSs or physical channel quality indicators, as described earlier.

Figure 15:
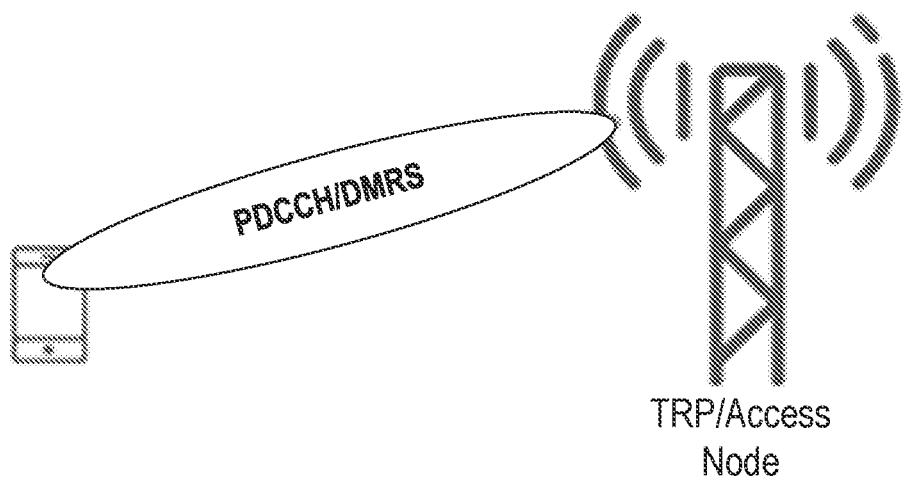
FIG. 15 is a diagram illustrating PDCCH and DMRS on a similar beam pattern, according to some embodiments.
Figure 16:
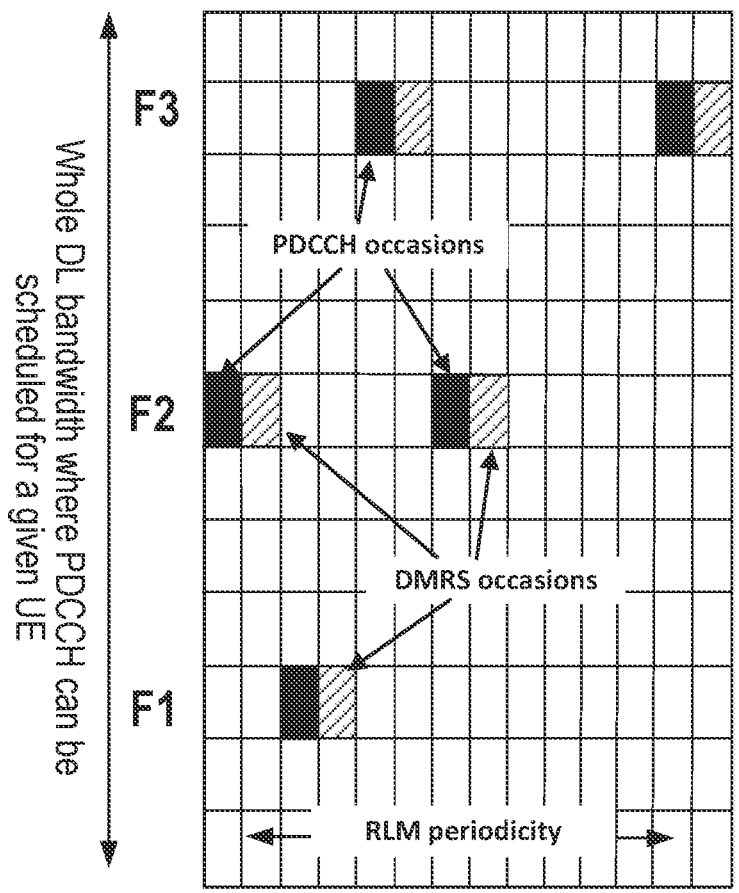
FIG. 16 is a diagram illustrating PDCCH and DMRS on similar frequency resources, according to some embodiments.

When a UE is scheduled with PDCCH, the UE may estimate PDCCH quality based on the DMRS which is transmitted over the same antenna port as PDCCH. The transmission configuration corresponding to this approach is illustrated in FIGS. 15 and 16. FIG. 15 illustrates a PDCCH and DMRS on a similar beam pattern (and transmitted over the same antenna port—this is necessary, since the DMRS is used for estimating the channel the PDCCH is transmitted over). FIG. 16 illustrates PDCCH and DMRS on similar frequency resources.

Figure 17:
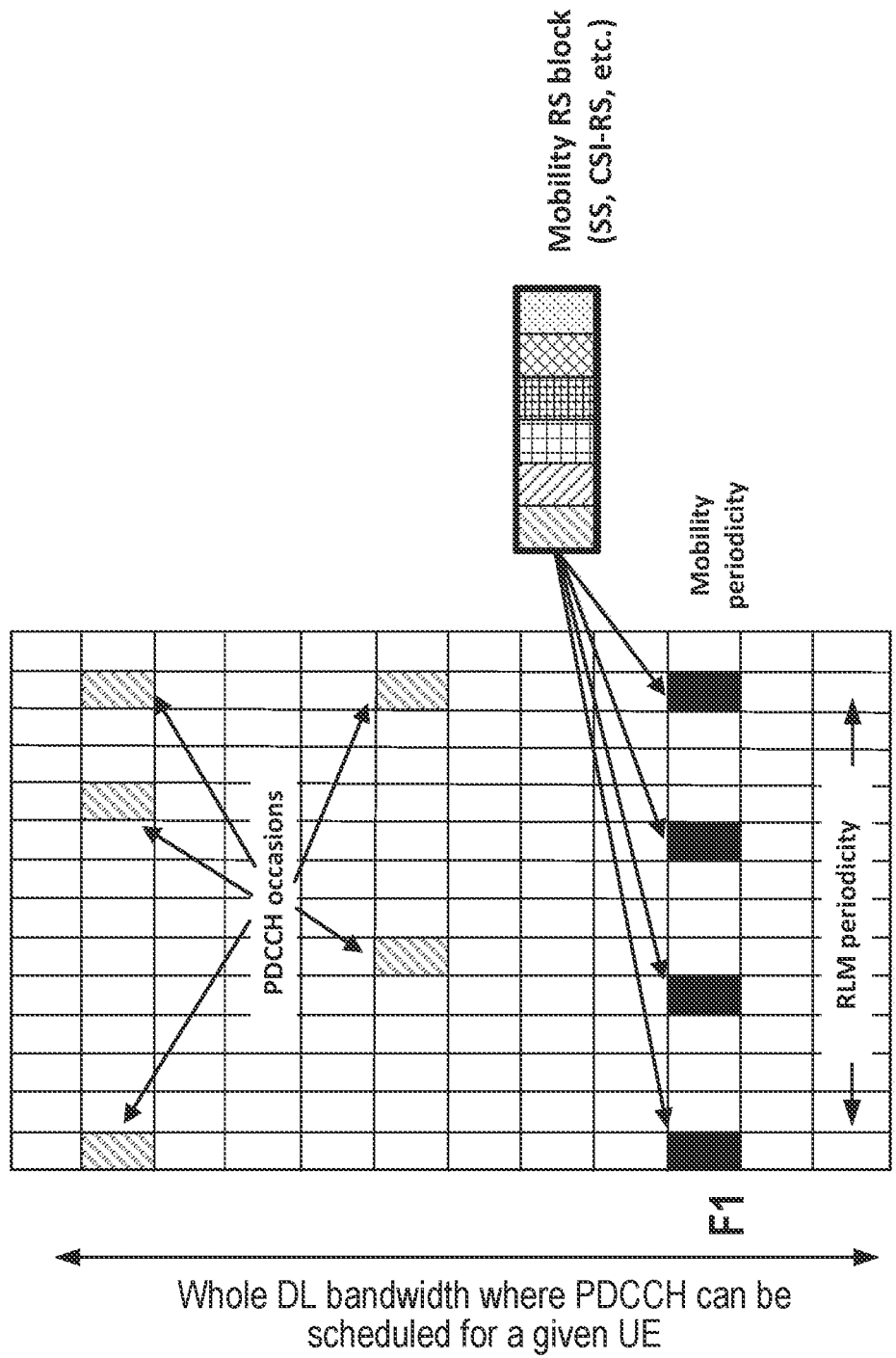
FIG. 17 is a diagram illustrating a mobility RS and PDCCH resource configuration, according to some embodiments.

When the UE is not scheduled with any PDCCH, the UE may measure a hypothetical PDCCH for RLM that is assumed to be transmitted to UE according to MRS, SS, CSI-RS, etc. This is a reasonable assumption due to the fact that if the network does not schedule any PDCCH for a while, the network cannot possibly know where the UE is exactly. Therefore, the network may need to transmit a wide beam, which can be based on MRS, SS, CSI-RS, to make sure that UE can successfully detect such beam at least for RLM and beam failure detection purposes. All the different types of RS transmission mentioned above can be adopted here for the network-side configuration of mobility RS resource allocation. An example resource configuration for mobility RS with respect to PDCCH occasions is illustrated in FIG. 17.

Figure 18:
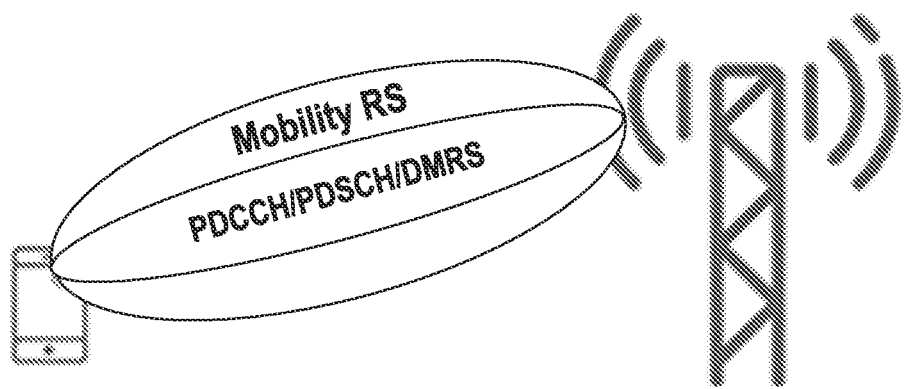
FIG. 18 is a diagram illustrating mobility RS and PDCCH on different beams, according to some embodiments.

However, as opposed to the methods in the proposed solutions discussed in the background, the RS in this embodiment is not necessarily transmitted on the same beam pattern where PDCCH is configured. The RS (e.g., MRS) can be transmitted by the serving TRP as a common set of reference signals and all nearby UEs are able to read these MRSs from the serving MRS set as synchronization sources. In that case, the transmission of MRS and PDCCH can be configured on different beams, as illustrated in FIG. 18.

During irregular PDCCH scheduling periods with short intervals, it is likely that the network continues configuring PDCCH on the same frequency resources as before. Hence, the UE may be able to receive and measure mobility RSs (e.g., MRS, SS, CSI-RS) on similar resources even when PDCCH/DMRS is not available for RLM measurements. In addition, mobility RS is a common reference signal, whereas PDCCH and DMRS are transmitted in a UE-specific manner. Hence, multiple UEs in the network should be able to derive their own unique hypothetical PDCCH quality based on the same common RS. The configuration of RSs on time-frequency resources may have the following types with respect to UE-specific PDCCH occasions.

In some cases, the RS may be configured within PDCCH occasions. In such cases, periodic RS is transmitted on some of the available frequency resources for mobility event measurements. In addition to that, the network may configure additional RS at every hypothetical PDCCH occasion. These occasions are the time-frequency blocks on the resource table where the network is likely to transmit the next PDCCH. The hypothetical PDCCH occasions can be the same as the last scheduled PDCCH occasions by the network or different blocks in the resource table. In either case, hypothetical PDCCH occasion refers to the time/frequency allocation of the actual PDCCH as configured by the network. According to some embodiments, the network configures additional RS at every frequency block where at least one UE-specific PDCCH occasion is configured.

Figure 19:
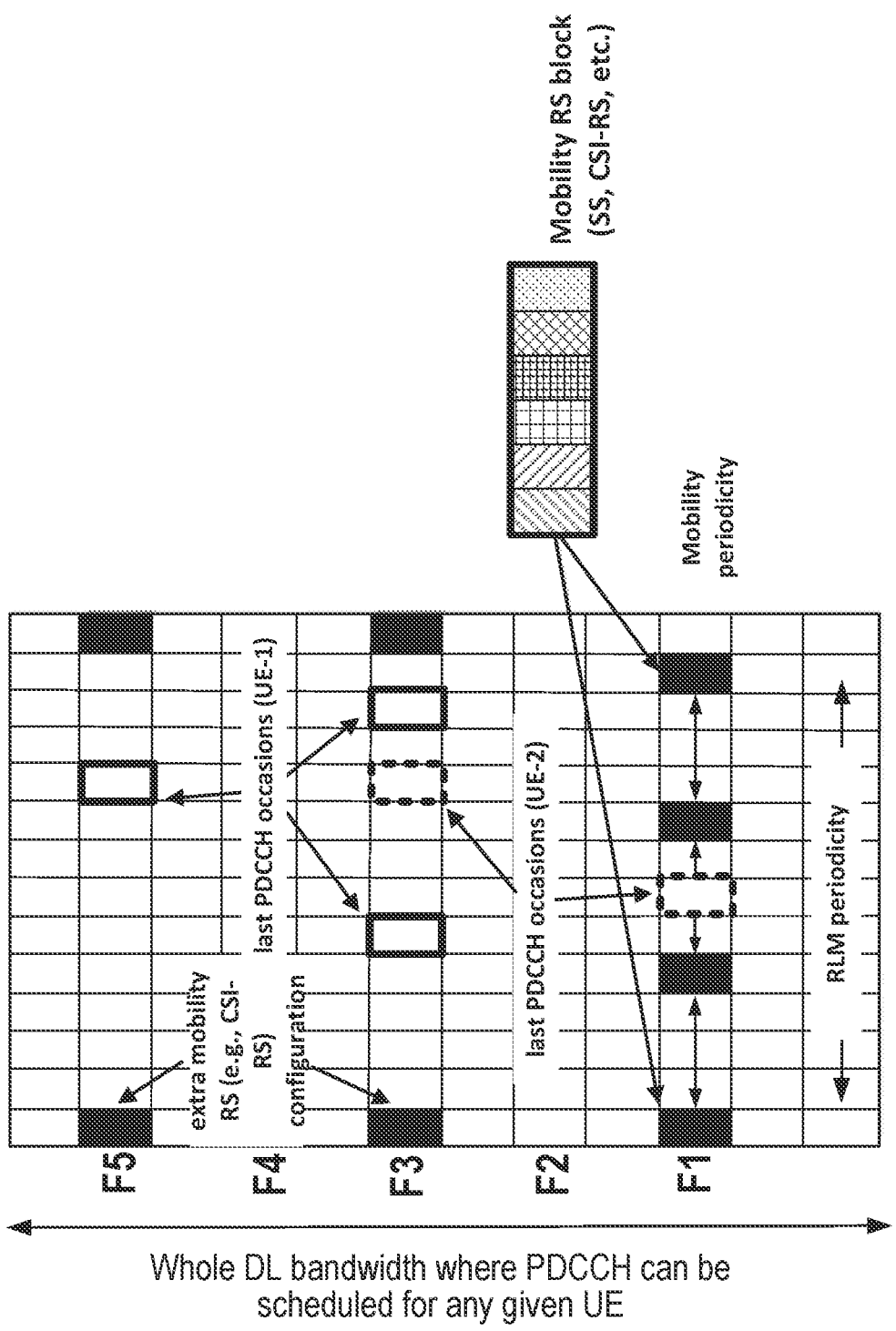
FIG. 19 is a diagram illustrating a mobility RS configuration with PDCCH occasions, according to some embodiments.

FIG. 19 illustrates a configuration for beamformed RSs for mobility measurements within PDCCH occasions. According to this figure, periodic RS is configured at frequency resource F1 with a short time periodicity. UE-1 is configured for PDCCH monitoring at frequency F3 and F5 while UE-2 is configured for PDCCH monitoring at frequency F1 and F3. In this illustration neither UE-1 nor UE-2 is scheduled any PDCCH due to data inactivity. The network configures additional RS at frequency F3 and F5 with longer time periodicity. These additional RS are transmitted sporadically since they are needed only for RLM measurements. It should be noted that the additional RS at F3 can be used by both UE-1 and UE-2 to estimate hypothetical PDCCH qualities. It is also worth noting that the network does not need to configure any additional RSs at F1 since the same RS used for mobility event measurements can be used for RLM purposes as well.

This approach allows a flexible UE measurement opportunity for RLM. Connected-mode UEs may search for PDCCH/DMRS and RSs at the same time on the same frequency resources and perform RLM based on either one or both. The UE does not need to be configured for which RS should be used for RLM. For example, UE-2 in FIG. 19 may use both a mobility RS and DMRS for RLM even when the UE is scheduled PDCCH, which may likely improve the RLM accuracy as a result of taking more measurement samples from two types of RS. Another possible UE implementation may be searching for PDCCH occasions and relying on only one type of RS measurements (either DMRS or mobility RS) depending on PDCCH has been detected or not, which would simplify UE complexity.

As a further sub-embodiment, a possible network-side implementation may be deactivating some of these additional mobility RSs (e.g., at F3 and F5 in FIG. 19) when the corresponding UEs are once again scheduled PDCCH on the same occasions. Such opportunistic implementation may improve the lean signaling. Alternatively, the network may not deactivate those mobility RS which would allow UEs to perform RLM with more flexibility as discussed above.

The mobility RS may also be configured outside PDCCH occasions. In this approach, network configures additional mobility RSs outside of hypothetical PDCCH occasions. Similarly, the periodicity of these additional mobility RSs can be longer than the mobility RS block depending on the periodicity of PDCCH occasions. In this configuration option, the network has more flexibility in the frequency resource configuration of mobility RSs. However, UEs may need to be configured with the frequency resources of these additional mobility RSs. Each UE first tries to detect the PDCCH according to its configuration. If no PDCCH/DMRS is detected, UE searches for similar resources for mobility RSs. This search can be pre-configured by the network so that UE already knows where to find these additional mobility RSs. The configuration of these mobility RS occasions can be either based on a fixed frequency shift relative to the hypothetical PDCCH frequency allocation or the UE can be configured flexibly every time a new configuration is needed.

Figure 20:
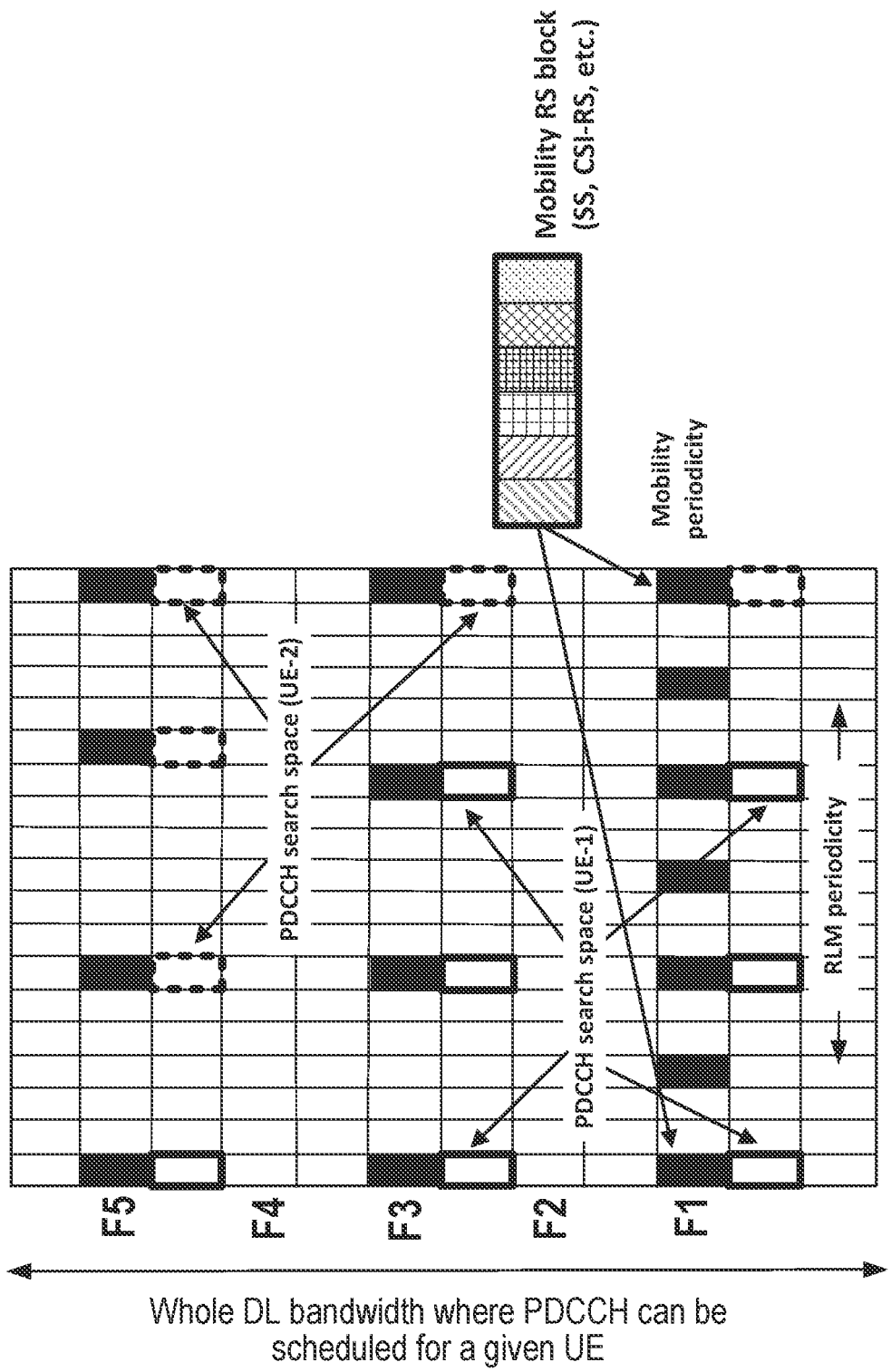
FIG. 20 is a diagram illustrating a mobility RS configuration outside all PDCCH occasions, according to some embodiments.

The mobility RS may be configured outside all PDCCH occasions. This approach is illustrated in FIG. 20. UE-1 and UE-2 are configured with different PDCCH frequency allocations and the network transmits additional mobility RSs with fixed frequency shifts relative to the corresponding PDCCH occasions.

According to some implementations, the network may or may not deactivate these additional mobility RSs when UEs are scheduled with PDCCH again. If not deactivated, UEs may measure both DMRS/PDCCH and mobility RSs for RLM.

This configuration option requires a more complex UE search algorithm and/or more UE configuration. On the other hand, the network has more flexibility in frequency resource allocation. Also, since the network can configure mobility RSs on different frequency blocks than PDCCH occasions, the same mobility RSs can be used by more UEs. Therefore, the amount of signaling overhead can be controlled by optimizations.

The mobility RS may be configured outside PDCCH occasions during RLM intervals. In this approach, the network configures additional mobility RSs outside PDCCH occasions, but only during RLM intervals. Here, the amount of additional mobility RSs is less than the other flavors above. So, this is the leanest configuration.

Figure 21:
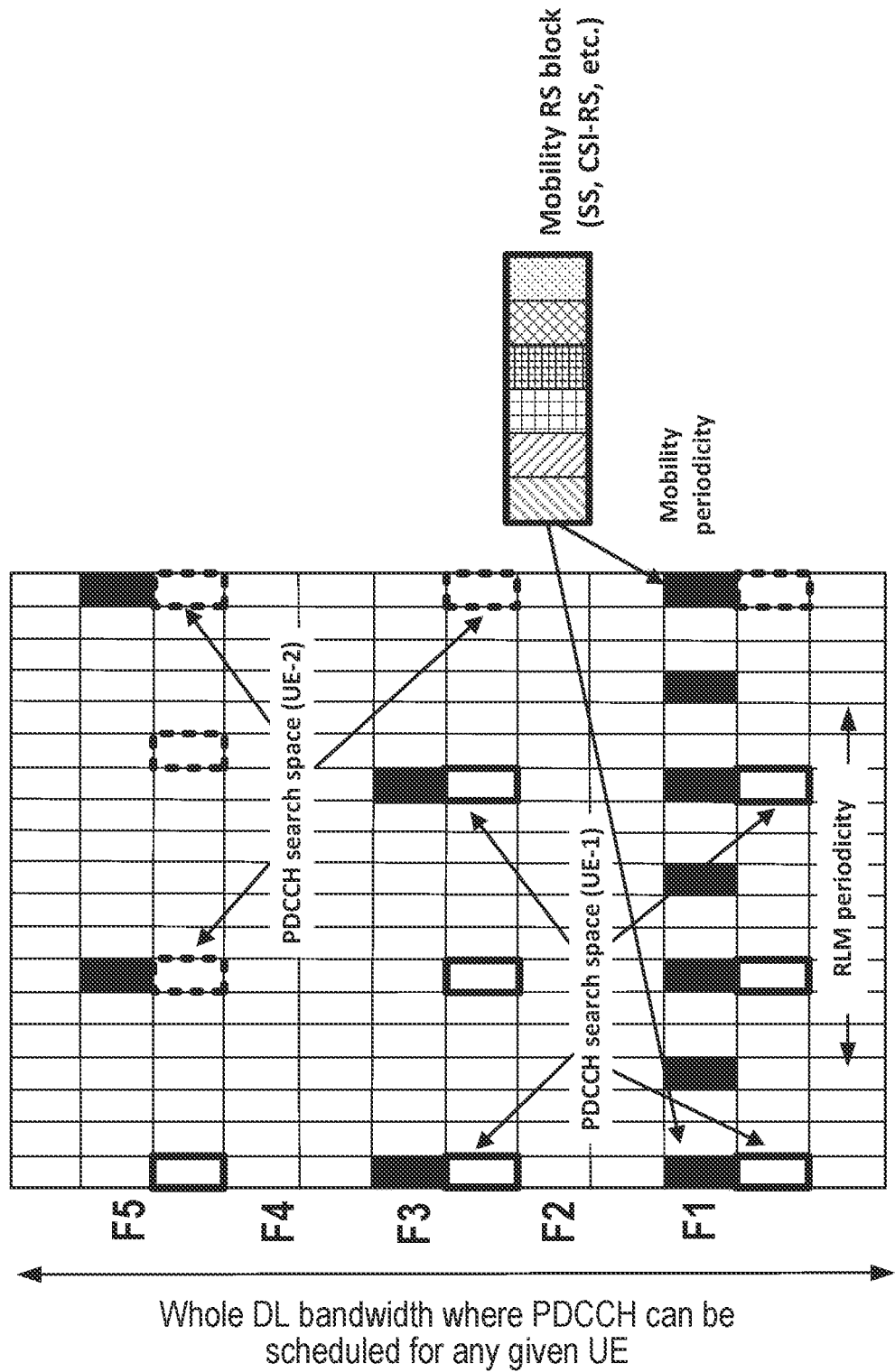
FIG. 21 is a diagram illustrating a mobility RS configuration outside PDCCH occasions with RLM periodicity, according to some embodiments.

FIG. 21 shows a mobility RS configuration outside PDCCH occasions with RLM periodicity. In addition to frequency block F1, both UE-1 and UE-2 have hypothetical PDCCH occasions at F3 and F5. Hence, the network configures additional mobility RSs. However, the periodicity of these mobility RSs is as sporadic as the RLM periodicity. According to this figure, a possible UE configuration can be a fixed frequency shift relative to the PDCCH occasion. As an example, UE-1 needs to measure its hypothetical PDCCH quality at F5. Based on this configuration, UE-2 searches for its PDCCH occasion at F5. If there is scheduled PDCH, RLM can be based on the detected DMRS/PDCCH. If no PDCCH/DMRS is detected at F5, UE-2 may continue searching for some mobility RSs based on the configured frequency shift until the first mobility RS occasion is detected as illustrated in FIG. 21.

Accordingly, in some embodiments, the DMRSs and the physical channel quality indicator are configured for beamformed downlink signals on the same beam. In other embodiments, the one or more of the PSSs, SSSs, TSSs, CSI-RSs, MRSs and BRSs are transmitted on a wide beam during a period when the wireless device is not scheduled with the physical control channel region. The RSs and the physical control channel region may be transmitted on beam-formed downlink signals that are in different beams.

The method 1400 may include transmitting configuration information for one or more of the plurality of RLM measurement sources and configuring the wireless device to perform the measurements based on the configuration information. The method 1400 may also include transmitting additional RSs in time-frequency resources corresponding to those that would be used if a control channel message for the wireless device were included in the physical control channel region and transmitting configuration information corresponding to the additional RSs. In some cases, the method 1400 may further include deactivating the transmitting of the additional RSs in the time-frequency resources when a control channel message is to again be included in the physical control channel region.

Figure 9:
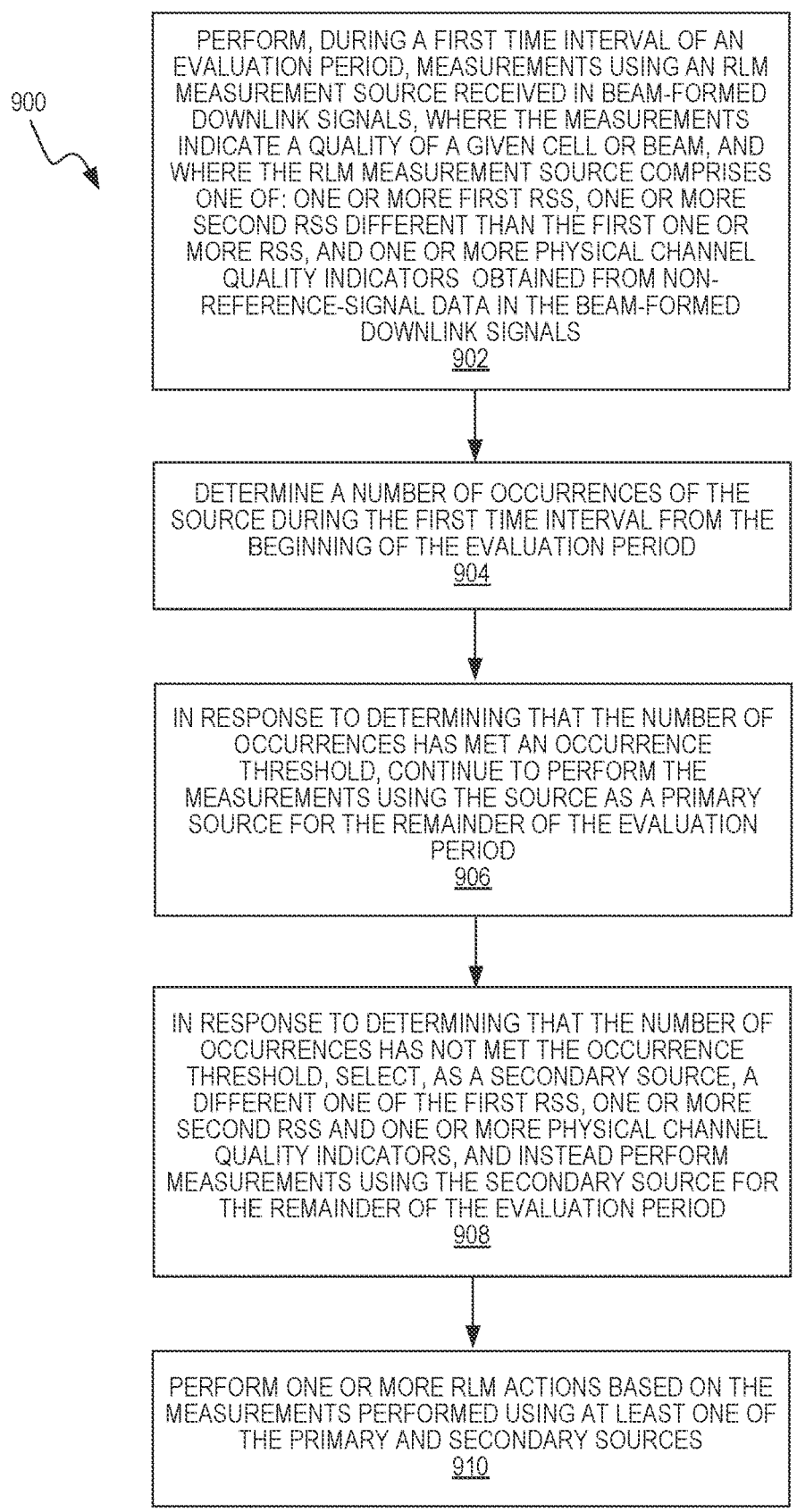
FIG. 9 illustrates another method in the wireless device, according to some embodiments.

As discussed in detail above, the techniques described herein, e.g., as illustrated in the process flow diagrams of FIGS. 6, 9 and 14, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 22:
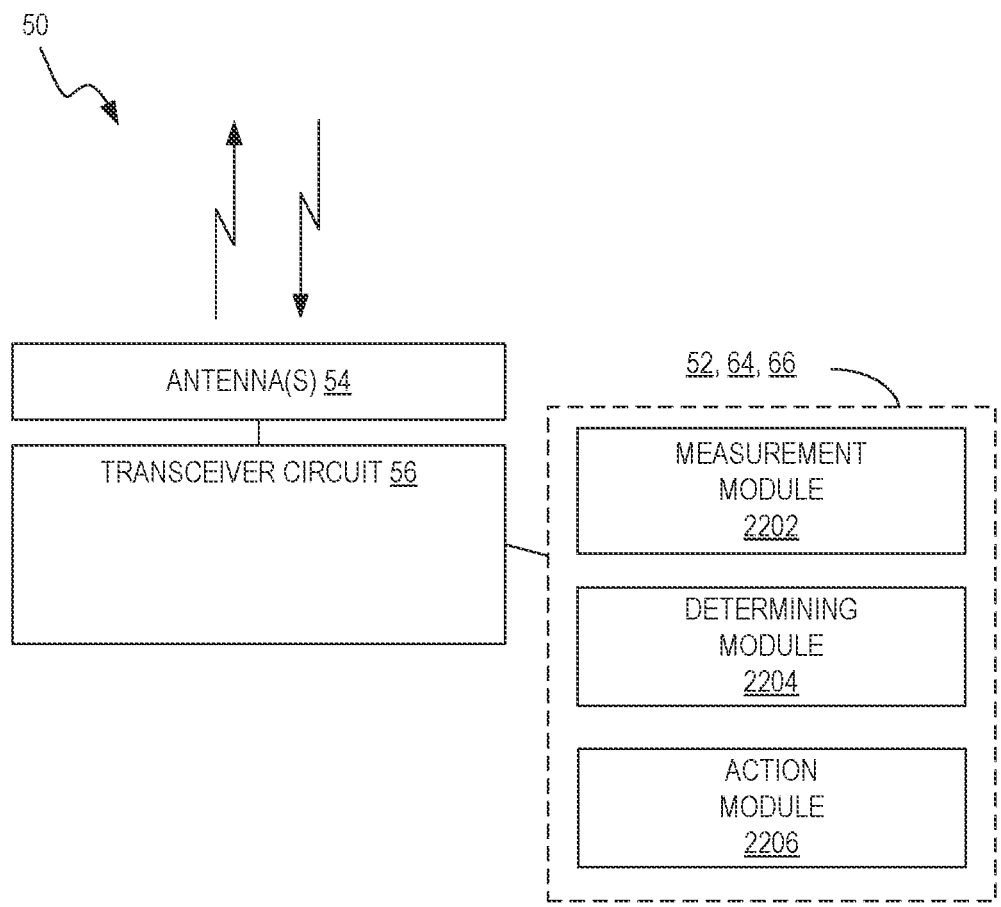
FIG. 22 is a block diagram illustrating a functional implementation of a wireless device, according to some embodiments.

FIG. 22 illustrates an example functional module or circuit architecture as may be implemented in a wireless device, such as in the wireless device 50. The functional implementation includes a measurement module 2202 for performing measurements based on a plurality of RLM measurement sources received in beam-formed downlink signals, where the measurements indicate a quality of a given cell or beam. The plurality of RLM measurement sources comprises two or more of: one or more first RSs, one or more second RSs different than the first one or more RSs, and one or more physical channel quality indicators obtained from non-reference-signal data in the beam-formed downlink signals. The implementation also includes a determining module 2204 for, for each of a plurality of evaluation periods, and for each of the plurality of RLM measurement sources used to perform measurements, determining whether a measurement for the respective RLM measurement source indicates an out-of-sync event in response to the measurement being below a first threshold or determining whether the measurement for the respective RLM measurement source indicates an in-sync event in response to the measurement being above a second threshold. The implementation also includes an action module 2206 for performing one or more RLM actions based on determined occurrences of in-sync and/or out-of-sync events.

Figure 23:
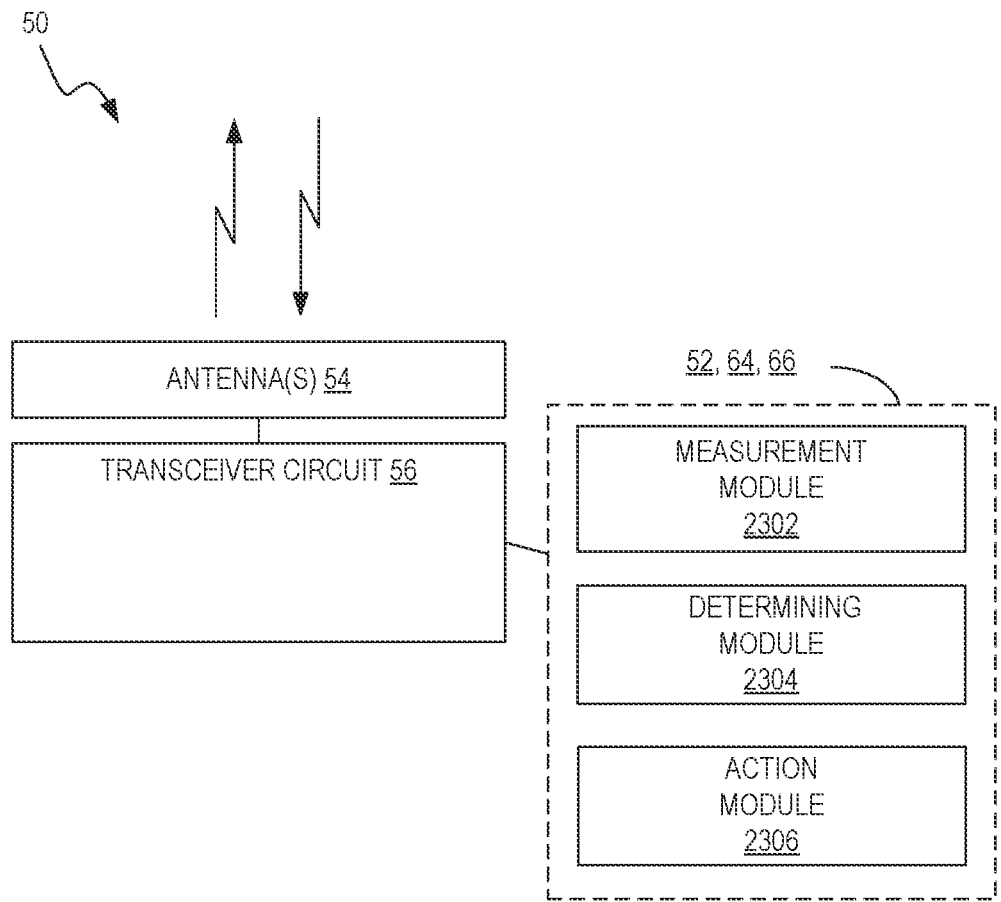
FIG. 23 is a block diagram illustrating another functional implementation of the wireless device, according to some embodiments.

FIG. 23 illustrates another example functional module or circuit architecture as may be implemented in a wireless device. The functional implementation includes a measurement module 2302 for performing, during a first time interval of an evaluation period, measurements using an RLM measurement source received in beam-formed downlink signals, where the measurements indicate a quality of a given cell or beam. The source comprises one of: one or more first RSs, one or more second RSs different than the first one or more RSs, and one or more physical channel quality indicators obtained from non-reference-signal data in the beam-formed downlink signals. The implementation includes a determining module 2304 for determining a number of occurrences of the RLM measurement source during the first time interval from the beginning of the evaluation period. In response to determining that the number of occurrences has met an occurrence threshold, the determining module 2304 is for continuing to perform the measurements using the RLM measurement source as a primary source for the remainder of the evaluation period. In response to determining that the number of occurrences has not met the occurrence threshold, the determining module 2304 is also for selecting, as a secondary source, a different one of the one or more first RSs, one or more second RSs and one or more physical channel quality indicators obtained from non-reference-signal data in the beam-formed downlink signals, and instead performing measurements using the secondary source for the remainder of the evaluation period. The implementation further includes an action module 2306 for performing one or more RLM actions based on the measurements performed using at least one of the primary and secondary sources.

Figure 24:
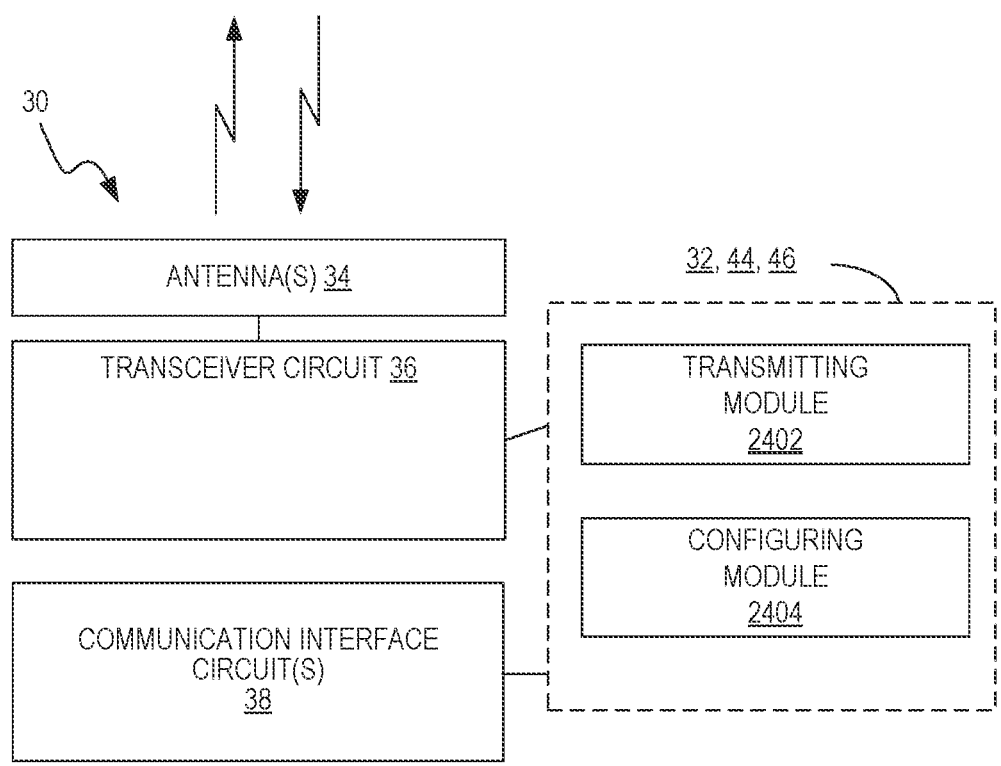
FIG. 24 is a block diagram illustrating a functional implementation of a network node, according to some embodiments.

FIG. 24 illustrates an example functional module or circuit architecture as may be implemented in a network node in a wireless communication network, such as network node 30. The implementation includes a transmitting module 2402 for transmitting, in beam-formed downlink signals, a plurality of RLM measurement sources, where the plurality of sources comprises one or more first RSs and one or more second RSs different than the first one or more RSs. The implementation also includes a configuring module 2404 for configuring a wireless device to perform measurements based on the plurality of RLM measurement sources received in the beam-formed downlink signals, wherein the measurements indicate a quality of a given cell or beam. The wireless device is then enabled to perform one or more RLM actions based on occurrences of in-sync and out-of-sync events determined from the measurements.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a user equipment (UE), the method comprising:

performing measurements based on each of a plurality of radio link management (RLM) measurement sources received in beam-formed downlink signals, wherein each measurement indicates a quality of a given cell or beam, and wherein the plurality of RLM measurement sources comprises one or more first reference signals (RSs) and one or more second RSs of a different type than the first one or more RSs;

for each of a plurality of evaluation periods and for each of the plurality of RLM measurement sources used to perform the measurements, determining whether a measurement for the respective RLM measurement source is below a first threshold;

based on said determining, indicating an out-of-sync event to higher layers; and performing one or more RLM actions based on determined occurrences of out-of-sync events.

2. The method of claim 1, wherein the first and second RSs are channel-state information reference signals (CSI-RSs) and reference signals from one or more synchronization signal blocks (SSBs), respectively.

3. The method of claim 1, wherein performing the one or more RLM actions based on determined occurrences of out-of-sync events comprises performing a first RLM action in response to determining that a threshold number of consecutive out-of-sync events has occurred.

4. The method of claim 3, wherein the first RLM action comprises starting a timer.

5. The method of claim 3, wherein the first RLM action comprises one of: providing higher layer notifications; declaring radio link failure (RLF); and declaring beam failure.

6. The method of claim 3, wherein the threshold number of consecutive out-of-sync events is established separately for each source of the plurality of RLM measurement sources.

7. The method of claim 3, wherein the threshold number of consecutive out-of-sync events for one or more of the plurality of RLM measurement sources is shared by a different RLM measurement source.

8. The method of claim 1, wherein performing the measurements based on each of the plurality of RLM measurement sources comprises:

monitoring a control channel region of one or more of the beam-formed downlink signals and associated with a control channel message for the UE; and in response to determining that data is scheduled in a given subframe of the control channel region:

determining, during an evaluation period, a first measurement by computing a first quality estimate using one or more first RSs, wherein the first RSs are demodulation reference symbols (DMRS) in the control channel region; and determining, during the evaluation period, a second measurement by computing a second quality estimate using the one or more second RSs, wherein the one or more second RSs are one of: one or more primary synchronization signals (PSSs); one or more secondary synchronization signals (SSSs); one or more tertiary synchronization signals (TSSs); one or more DMRSs used for a physical broadcast channel (PBCH); one or more of channel state information-reference signals (CSI-RSs); one or more mobility reference signals (MRSs); and one or more beam measurement reference signals (BRSs).

9. The method of claim 8, wherein the first quality estimate is computed as an average of first radio signal metrics measured from the one or more first RSs over the evaluation period, and wherein the second quality estimate is computed as an average of second radio signal metrics measured from the one or more second RSs over the evaluation period.

10. A user equipment (UE) comprising:
transceiver circuitry configured to receive beam-formed downlink signals; and
processing circuitry operatively associated with the transceiver circuitry and configured to:
perform measurements based on each of a plurality of radio link management (RLM) measurement sources received in beam-formed downlink signals, wherein each measurement indicates a quality of a given cell or beam, and wherein the plurality of RLM measurement sources comprises one or more first reference signals (RSs) and one or more second RSs of a different type than the first one or more RSs;
for each of a plurality of evaluation periods and for each of the plurality of RLM measurement sources used to perform the measurements, determine whether a measurement for the respective RLM measurement source is below a first threshold;
based on said determining, indicate an out-of-sync event to higher layers; and
performing one or more RLM actions based on determined occurrences of out-of-sync events.

11. The UE of claim 10, wherein the first and second RSs are channel-state information reference signals (CSI-RSs) and reference signals from one or more synchronization signal blocks (SSBs), respectively.

12. The UE of claim 10, wherein the processing circuitry is configured to perform the one or more RLM actions based on determined occurrences of out-of-sync events by performing a first RLM action in response to determining that a threshold number of consecutive out-of-sync events has occurred.

13. The UE of claim 12, wherein the first RLM action comprises starting a timer.

14. The UE of claim 12, wherein the first RLM action comprises one of: providing higher layer notifications; declaring radio link failure (RLF); and declaring beam failure.

15. The UE of claim 12, wherein the threshold number of consecutive out-of-sync events is established separately for each source of the plurality of RLM measurement sources.

16. The UE of claim 12, wherein the threshold number of consecutive out-of-sync events for one or more of the plurality of RLM measurement sources is shared by a different RLM measurement source.

17. The UE of claim 10, wherein the processing circuitry is configured to perform the measurements based on the plurality of RLM measurement sources by:
monitoring a control channel region of one or more of the beam-formed downlink signals and associated with a control channel message for the UE; and
in response to determining that data is scheduled in a given subframe of the control channel region:
determining, during an evaluation period, a first measurement by computing a first quality estimate using one or more first RSs, wherein the first RSs are demodulation reference symbols (DMRS) in the control channel region; and
determining, during the evaluation period, a second measurement by computing a second quality estimate using the one or more second RSs, wherein the one or more second RSs are one of: one or more primary synchronization signals (PSSs); one or more secondary synchronization signals (SSSs); one or more tertiary synchronization signals (TSSs); one or more DMRSs used for a physical broadcast channel (PBCH); one or more of channel state information-reference signals (CSI-RSs); one or more mobility reference signals (MRSs); and one or more beam measurement reference signals (BRSs).

18. The UE of claim 17, wherein the first quality estimate is computed as an average of first radio signal metrics measured from the one or more first RSs over the evaluation period, and wherein the second quality estimate is computed as an average of second radio signal metrics measured from the one or more second RSs over the evaluation period.

19. The UE of claim 10, wherein the processing circuitry is configured to:
receive configuration information for one or more of the plurality of RLM measurement sources; and
perform the measurements based on the configuration information.

20. A non-transitory computer-readable medium comprising, stored thereupon, a computer program comprising computer program code that, when run on a user equipment (UE) causes the UE to:
perform measurements based on each of a plurality of radio link management (RLM) measurement sources received in beam-formed downlink signals, wherein each measurement indicates a quality of a given cell or beam, and wherein the plurality of RLM measurement sources comprises one or more first reference signals (RSs) and one or more second RSs of a different type than the first one or more RSs;
for each of a plurality of evaluation periods and for each of the plurality of RLM measurement sources used to perform the measurements, determine whether a measurement for the respective RLM measurement source is below a first threshold;
based on said determining, indicate an out-of-sync event to higher layers; and
perform one or more RLM actions based on determined occurrences of out-of-sync events.

* * * * *